(12) United States Patent
Sasaki

(10) Patent No.: US 7,864,458 B2
(45) Date of Patent: Jan. 4, 2011

(54) LENS BARREL

(75) Inventor: Takamitsu Sasaki, Saitama (JP)

(73) Assignee: Hoya Corporation, Tokyo (JP)

( * ) Notice: Subject to any disclaimer, the term of this patent is extended or adjusted under 35 U.S.C. 154(b) by 45 days.

(21) Appl. No.: 12/413,724

(22) Filed: Mar. 30, 2009

(65) Prior Publication Data

US 2009/0251799 A1 Oct. 8, 2009

(30) Foreign Application Priority Data

Apr. 2, 2008 (JP) ............................. 2008-095595
Apr. 2, 2008 (JP) ............................. 2008-095596

(51) Int. Cl.
G02B 7/02 (2006.01)
(52) U.S. Cl. ..................... 359/819; 359/811; 359/813
(58) Field of Classification Search ......... 359/694–703, 359/819–824; 396/74, 75, 349
See application file for complete search history.

(56) References Cited

U.S. PATENT DOCUMENTS

| 4,825,235 | A | 4/1989 | Wakabayashi et al. | 396/75 |
|---|---|---|---|---|
| 6,978,089 | B2 * | 12/2005 | Nomura et al. | 396/75 |
| 7,338,219 | B2 * | 3/2008 | Ishizuka et al. | 396/349 |
| 7,507,040 | B2 * | 3/2009 | Nomura et al. | 396/349 |
| 7,511,900 | B2 | 3/2009 | Imagawa et al. | 359/813 |
| 7,633,693 | B2 * | 12/2009 | Hung et al. | 359/826 |
| 2003/0081328 | A1 | 5/2003 | Nomura et al. | 359/700 |
| 2003/0081329 | A1 | 5/2003 | Nomura et al. | 359/700 |
| 2003/0081948 | A1 | 5/2003 | Nomura et al. | 396/72 |
| 2006/0268430 | A1 | 11/2006 | Sasaki | 359/699 |
| 2006/0268436 | A1 | 11/2006 | Sasaki | 359/822 |

* cited by examiner

Primary Examiner—Mohammed Hasan
(74) Attorney, Agent, or Firm—Greenblum & Bernstein P.L.C.

(57) ABSTRACT

A lens barrel includes a support ring movable in an optical axis direction; a displaceable optical element supported by the support ring movable between a photographing position and a radially-displaced position in which the displaceable optical element is eccentrically displaced from the optical axis; and an advancing/retracting optical element supported by the support ring. When the lens barrel is in a ready-to-photograph state, the displaceable optical element is held at the photographing position, and the displaceable optical element and the advancing/retracting optical element are aligned in the optical axis direction. When the lens barrel moves from the ready-to-photograph state to an accommodated state, the displaceable optical element is held at the radially-displaced position, and the displaceable optical element and the advancing/retracting optical element are relatively moved so as to at least partially coincide with each other in a direction orthogonal to the optical axis.

19 Claims, 21 Drawing Sheets

LENS BARREL

BACKGROUND OF THE INVENTION

1. Field of the Invention

The present invention relates to a lens barrel, and in particular, relates to a retracting structure of a lens barrel with a displaceable optical element which is radially displaced to a displaced position eccentric to a photographing optical axis when the lens barrel moves from a ready-to-photograph state to an accommodated state, in which no pictures can be taken.

2. Description of the Related Art

In a retractable lens barrel for a camera that reduces the length thereof in a non-photograph state (accommodated state) for the purpose of miniaturization of the camera, specifically for reduction in thickness of the camera, a further reduction in length of the lens barrel in the accommodated state has been desired. As a solution to this problem, the assignee of the present invention has proposed a retractable lens barrel disclosed in U.S. Pat. No. 6,978,089 (hereinafter, U.S. Pat. No. '089). A feature of this retractable lens barrel is that a plurality of optical elements are positioned on the same photographing optical axis when the retractable lens barrel is in a ready-to-photograph state, and that apart of the plurality of optical elements is displaced to a position eccentric from the photographing optical axis while the optical element thus displaced and a part of the remaining optical elements (non-displaced optical elements) are independently moved rearward along the photographing optical axis when the lens barrel moves from a ready-to-photograph state to the fully retracted state (accommodated state).

In lens-shutter type lens barrels, it is often the case that a shutter unit which includes an adjustable diaphragm and a shutter for light quantity adjustment is supported by a lens holding frame which holds a lens group and moved integrally with this lens group in an optical axis direction. For instance, in an embodiment disclosed in the U.S. Pat. No. '089, the optical element that is displaceable from a photographing optical axis is a lens group, the shutter unit is fixed to a support ring which supports this displaceable lens group, and the relative position between the shutter unit and the displaceable lens group in the optical axis direction does not vary regardless of whether the lens barrel is in a ready-to-photograph state or the fully-retracted state (accommodated state). Although a reduction in length of the lens barrel in the fully-retracted state is achieved by adopting a structure in which the displaceable lens group is accommodated into the space radially outside the other lens groups that are positioned on the optical axis (i.e., the displaceable lens group is radially retracted into an axial range substantially identical to an axial range in the optical axis direction in which other lens groups are positioned) in the U.S. Pat. No. '089, there is still room for achieving a further reduction of the accommodation space for the displaceable lens group and the shutter unit, which are supported by a common support ring and moved integrally during a focal-length varying operation (zooming operation), in the accommodated state of the zoom lens, in which no pictures can be taken.

SUMMARY OF THE INVENTION

The present invention provides a lens barrel in which a first optical element (displaceable optical element) and a second optical element are supported by a common support ring, wherein the first optical element is moved from a position on an optical axis (on-axis position/photographing position) to an off-axis position (displaced position) eccentric from the optical axis when the lens barrel is fully retracted (in the accommodated state), wherein both the first optical element and the second optical element are positioned on the optical axis when the lens barrel is in a ready-to-photograph state, and the efficiency of space utilization in the lens barrel in the accommodated state thereof is enhanced to achieve a reduction in length of the lens barrel in the accommodated state thereof. The present invention further provides a lens barrel which is configured to ensure certainty and stability during operation of the retracting structure of the lens barrel.

According to an aspect of the present invention, a lens barrel is provided, including a support ring movable in an optical axis direction; a displaceable optical element supported by the support ring to be movable between a photographing position in which the displaceable optical element is positioned on the optical axis and a radially-displaced position in which the displaceable optical element is eccentrically displaced from the optical axis; and an advancing/retracting optical element supported by the support ring to be movable in the optical axis direction relative to the displaceable optical element. When the lens barrel is in a ready-to-photograph state, the displaceable optical element is held at the photographing position, and the displaceable optical element and the advancing/retracting optical element are aligned in the optical axis direction. When the lens barrel moves from the ready-to-photograph state to an accommodated state in which no pictures can be taken, the displaceable optical element is held at the radially-displaced position, and the displaceable optical element and the advancing/retracting optical element are relatively moved closely to each other so as to at least partially coincide with each other in a direction orthogonal to the optical axis.

It is desirable for the lens barrel to include a holding member which holds the advancing/retracting optical element and is supported by the support ring to be movable in the optical axis direction relative to the support ring; a movement limit device which determines a rear movement limit of the holding member in the optical axis direction; a biasing member which biases the holding member toward the rear movement limit thereof; and a rear limit member positioned behind the holding member in the optical axis direction. When the lens barrel is in the ready-to-photograph state, the holding member is held at the rear movement limit thereof and the advancing/retracting optical element is positioned behind the displaceable optical element. When the lens barrel moves from the ready-to-photograph state to the accommodated state, the support ring is moved rearward in the optical axis direction and the holding member abuts against the rear limit member so that the holding member is prevented from moving rearward in the optical axis direction thereby, whereby a relative movement in the optical axis direction between the holding member and the support ring occurs against a biasing force of the biasing member.

It is desirable for the rear limit member to include a rear holding member which holds a rear optical element which is positioned behind the advancing/retracting optical element, the rear holding member being movable in the optical axis direction independently of the support ring; and a stationary member positioned behind the rear holding member. When the lens barrel moves from the ready-to-photograph state to the accommodated state, the rear holding member rearwardly moves with the holding member of the advancing/retracting optical element and comes into contact with the stationary member to thereby be prevented from further rearward movement.

When the lens barrel is in the accommodated state, it is desirable for the rear optical element and the displaceable optical element to at least partially coincide with each other in a direction orthogonal to the optical axis. This structure is effective at reducing the length of the lens barrel in the accommodated state thereof.

It is desirable for the lens barrel to include a front optical element positioned in front of the displaceable optical element, the front optical element being movable in the optical axis direction independently of the support ring when the lens barrel is in the ready-to-photograph state. When the lens barrel moves from the ready-to-photograph state to the accommodated state, the front optical element approaches the advancing/retracting optical element so that the front optical element and the displaceable optical element overlap each other in the optical axis direction. According to this structure, a further improvement in efficiency of space utilization in the lens barrel in the accommodated state of the lens barrel is achieved.

It is desirable for the holding member to include an accommodation portion formed at a position therein which aligns with the displaced position of the displaceable optical element in the optical axis direction so as to be capable of accommodating the displaceable optical element, wherein a movement of the support ring relative to the advancing/retracting optical element when the lens barrel moves from the ready-to-photograph state to the accommodated state causes the displaceable optical element to enter into the accommodation portion of the holding member.

It is desirable for the displaceable optical element to include a lens group, and for the advancing/retracting optical element to include a light quantity adjusting member which changes an aperture size of a photographing aperture.

It is desirable for the lens barrel to be a zoom lens, in which focal length is variable, and for the displaceable optical element and the advancing/retracting optical element to move integrally in the optical axis direction with a predetermined fixed distance therebetween when a zooming operation is performed in the ready-to-photograph state of the lens barrel.

It is desirable for the support ring to be guided to move linearly in the optical axis direction without rotating about the optical axis.

It is desirable for a photographing optical system of the lens barrel to include three lens groups, the displaceable optical element constituting one of the three lens groups and being positioned between a frontmost lens group and a rearmost lens group of the three lens groups.

The biasing member can be a coil spring.

It is desirable for the stationary member to support an image pickup device.

It is desirable for the displaceable optical element to be supported by the support ring via a swingable member pivoted on the support ring at a pivot having an axis parallel to the optical axis.

In an embodiment, a lens barrel is provided, including a support ring; a first holding member supported by the support ring, the first holding member holding a displaceable optical element so that the displaceable optical element is movable between a photographing position in which the displaceable optical element is positioned on an optical axis and a radially-displaced position in which the displaceable optical element is eccentrically displaced from the optical axis; a second holding member supported by the support ring, the second holding member holding an advancing/retracting optical element so that the advancing/retracting optical element is movable in the optical axis direction relative to the displaceable optical element; an inserting/displacing-operation control device which holds the first holding member so that the displaceable optical element is held in the photographing position when the lens barrel is in a ready-to-photograph state, and holds the first holding member so that the displaceable optical element is held in the displaced position when the lens barrel is in an accommodated state in which no pictures can be taken; an advancing/retracting operation control device which controls positions of the first holding device and the second holding device in the support ring so that the displaceable optical element held at the photographing position and the advancing/retracting optical element are aligned in the optical axis direction when the lens barrel is in a ready-to-photograph state and so that the displaceable optical element held at the radially-displaced position and the advancing/retracting optical element at least partially coincide with each other in a direction orthogonal to the optical axis; and a displaced position holding device which is provided between the first holding member and the second holding member, the displaced position holding device preventing the first holding member from moving toward the photographing position from the radially-displaced position independently of the inserting/displacing-operation control device during an initial stage of movement of the lens barrel from the accommodated state to the ready-to-photograph state.

It is desirable for the second holding member to include an accommodation portion formed at position therein which aligns with the radially-displaced position of the displaceable optical element in the optical axis direction, the displaceable optical element entering the accommodation portion when the lens barrel moves from the ready-to-photograph state to the accommodated state. The displaced position holding device prevents the first holding member from moving toward the photographing position from the radially-displaced position when the first holding member and the second holding member at least partially coincide with each other in a direction orthogonal to the optical axis so as to make the displaceable optical element at least partially accommodated in the accommodation portion of the second holding member.

It is desirable for the first holding member to be pivoted about a pivot having an axis extending parallel to the optical axis so that the displaceable optical element moves between the photographing position and the displaced position by forward and reverse swing movements of the first holding member about the pivot, respectively. The displaced position holding device includes a pair of rotation limit surfaces which are respectively formed on one and the other of the first holding member and the second holding member to face each other in a rotation direction of the first holding member about the pivot and to be substantially parallel to the axis of the pivot.

It is desirable for the lens barrel to include two displacing-operation assist portions which are formed on the first holding member and the second holding member, respectively, and configured to impart a component force in a direction to move the first holding member toward the radially-displaced position of the displaceable optical element, the component force being created by a relative movement between the first holding member and the second holding member in the optical axis direction when the two displacing-operation assist portions come in contact with each other at some point during a transition from the ready-to-photograph state to the accommodated state of the lens barrel.

It is desirable for the support ring to be moved rearward in the optical axis direction when the lens barrel moves from the ready-to-photograph state to the accommodated state. The inserting/displacing-operation control device includes a biasing member which biases the first holding member toward the photographing position; and a displacement guide portion which is formed on a stationary member which is positioned behind the first holding member, the displacement guide portion being configured to create a component force in a direction to move the first holding member toward the radially-displaced position against a biasing force of the biasing member by engaging with the first holding member when the support ring is moved rearward in the optical axis direction.

As can be understood from the foregoing, according to the present invention, in a lens barrel including a displaceable optical element radially displaced from a position on an optical axis to a displaced position eccentric from the optical axis when the lens barrel is fully retracted, and an advancing/retracting optical element supported by a support ring which supports the displaceable optical element, a reduction in length of the lens barrel in the accommodated state thereof can be achieved by enhancing the efficiency of space utilization in the lens barrel in the retracted state thereof.

In addition, according to the present invention, in a lens barrel including a displaceable optical element radially displaced from a position on an optical axis to a displaced position eccentric from the optical axis when the lens barrel is in the accommodated state, and an advancing/retracting optical element controlled to move in the optical axis direction with the distance between the advancing/retracting optical element and the displaceable optical element in the optical axis direction being fixed when the lens barrel is in a ready-to-photograph state, a reduction in length of the lens barrel in the accommodated state thereof can be achieved by enhancing the efficiency of space utilization in the lens barrel in the accommodated state thereof while the first holding member that holds the displaceable optical element and the second holding member that holds the advancing/retracting optical element can be prevented from interfering with each other. This structure makes it possible to achieve certainty and stability during operation of the retracting structure of the lens barrel.

The present disclosure relates to subject matter contained in Japanese Patent Applications Nos. 2008-95595 and 2008-95596 (both filed on Apr. 2, 2008) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENT

Figure 1:
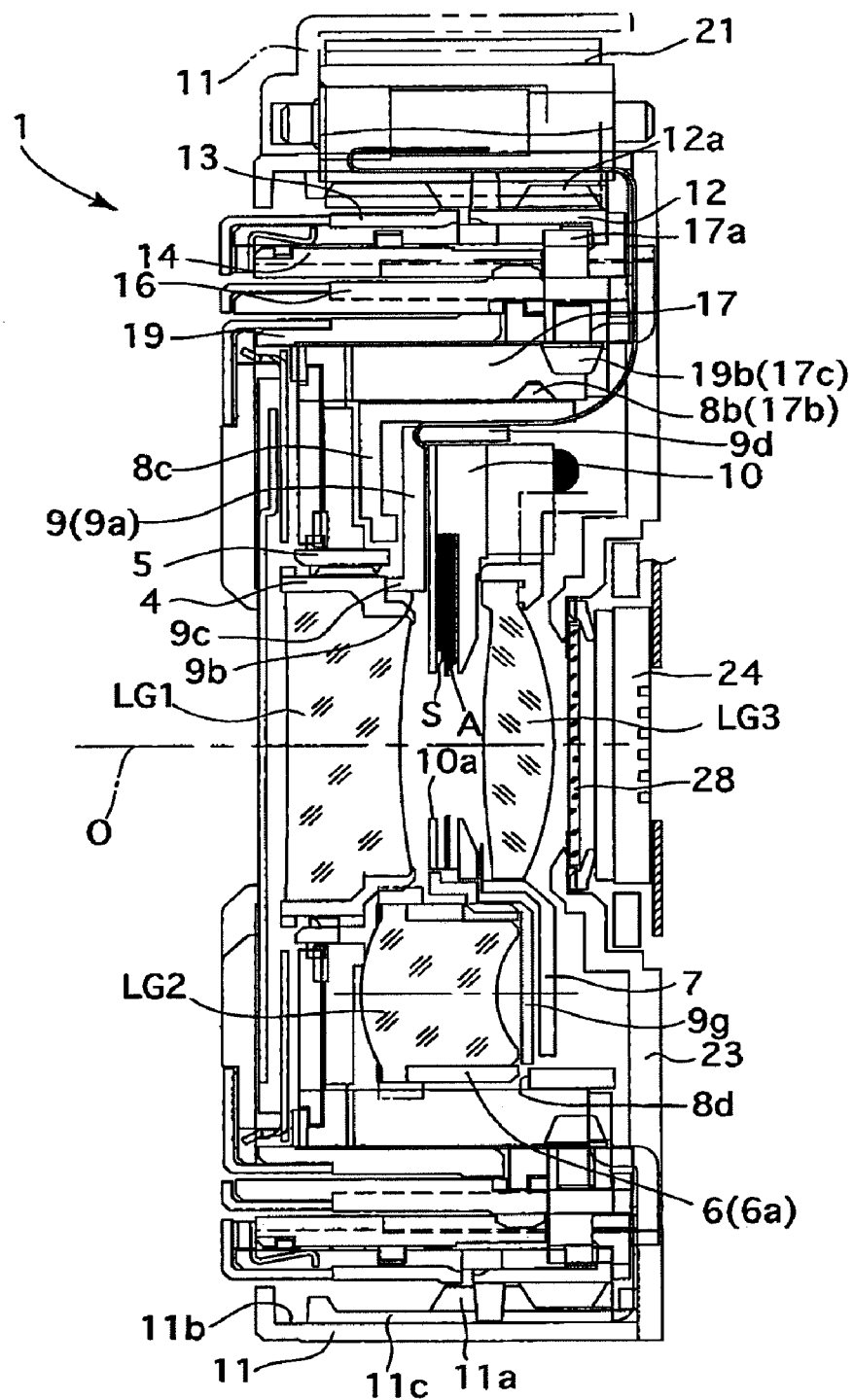
FIG. 1 is a cross sectional view of an embodiment of a retractable type of zoom lens according to the present invention, showing the accommodated state of the zoom lens.
Figure 2:
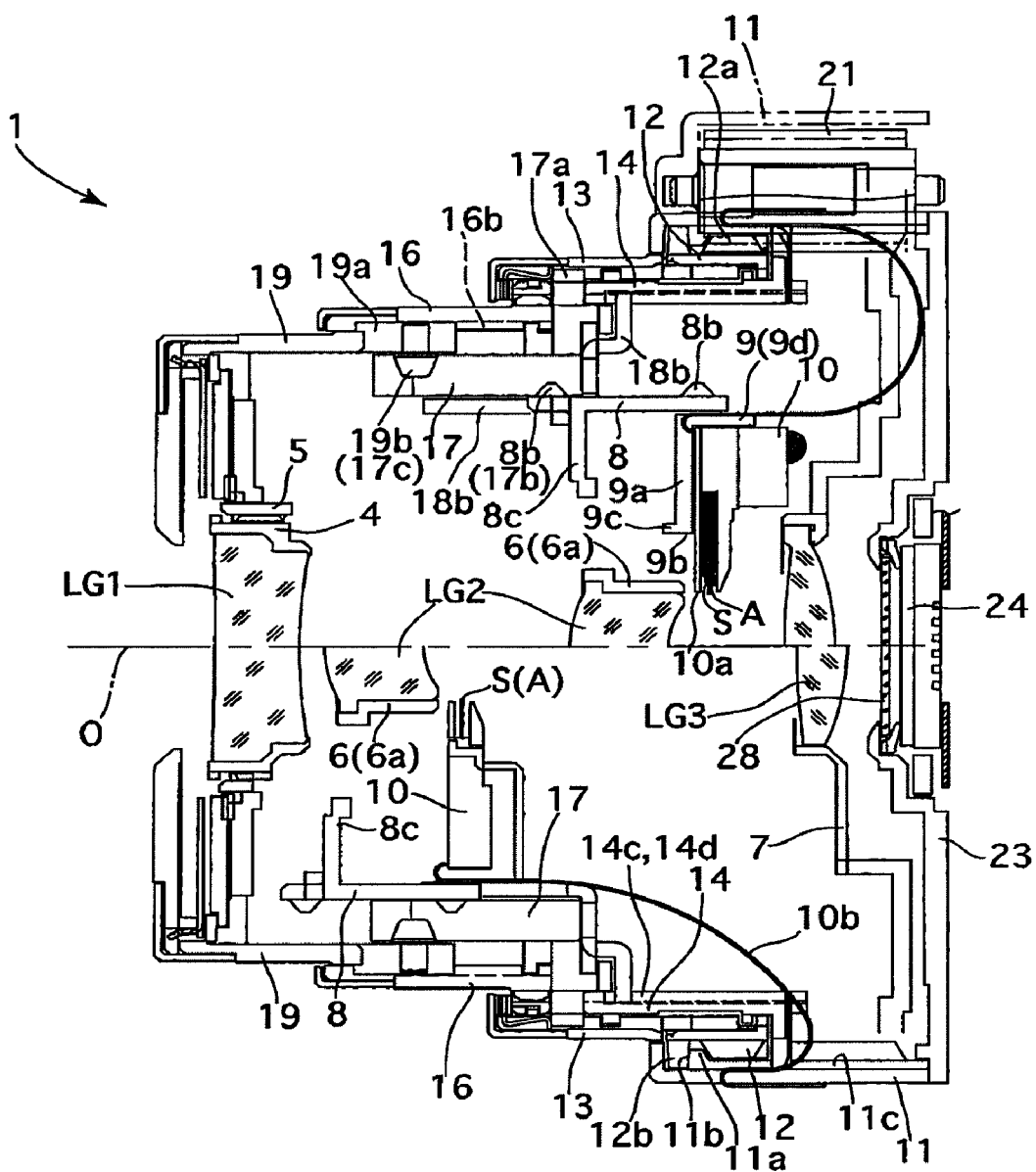
FIG. 2 is a cross sectional view of the zoom lens shown in FIG. 1, wherein an upper half and a lower half of the zoom lens from a photographing optical axis show a ready-to-photograph state of the zoom lens at the wide extremity and at the telephoto extremity, respectively.

The overall structure of an embodiment of a retractable zoom lens (zoom lens barrel) 1 according to the present invention will be hereinafter discussed with reference mainly to FIGS. 1 through 6. FIGS. 1 and 2 each show a cross sectional view of the zoom lens 1. FIG. 1 shows the lens barrel accommodated state (fully-retracted state) of the zoom lens 1, in which no pictures can be taken. An upper half of the zoom lens 1 in FIG. 2 shows a ready-to-photograph state of the zoom lens 1 set at the wide-angle extremity in the zoom range (photographing range), and a lower half of the zoom lens 1 in FIG. 2 shows the ready-to-photograph state of the zoom lens 1 set at the telephoto extremity in the zoom range. FIGS. 3 through 6 each show an exploded perspective view of main elements of the zoom lens 1.

The zoom lens 1 is provided with an optical system having three lens groups. More specifically, this optical system includes a first lens group (front optical element) LG1, a second lens group (displaceable optical element) LG2, a shutter (advancing/retracting optical element/light quantity adjusting member) S, an adjustable diaphragm (advancing/retracting optical element/light quantity adjusting member) A, a third lens group (rear optical element) LG3, a filter (optical filter) 28, and a CCD image sensor (image pickup device) 24, in that order from the object side. This optical system of the zoom lens 1 is a zoom optical system, in which the focal length is variable. The first lens group LG1 and the second lens group LG2 are moved along an optical axis O of the zoom optical system in a predetermined moving manner to perform a zooming operation. In addition, the third lens group L3 is moved along the optical axis O to perform a focusing operation.

Among the optical elements which constitute the optical system of the zoom lens 1, the filter 28 and the CCD image sensor 24 are held by a CCD support plate (rear limit member/stationary member/an element of an advancing/retracting operation control device) 23. The optical elements from the first lens group LG1 to the third lens group LG3 are supported inside a lens barrel housing 11 thereby which is fixed to the front of the CCD support plate 23.

Figure 3:
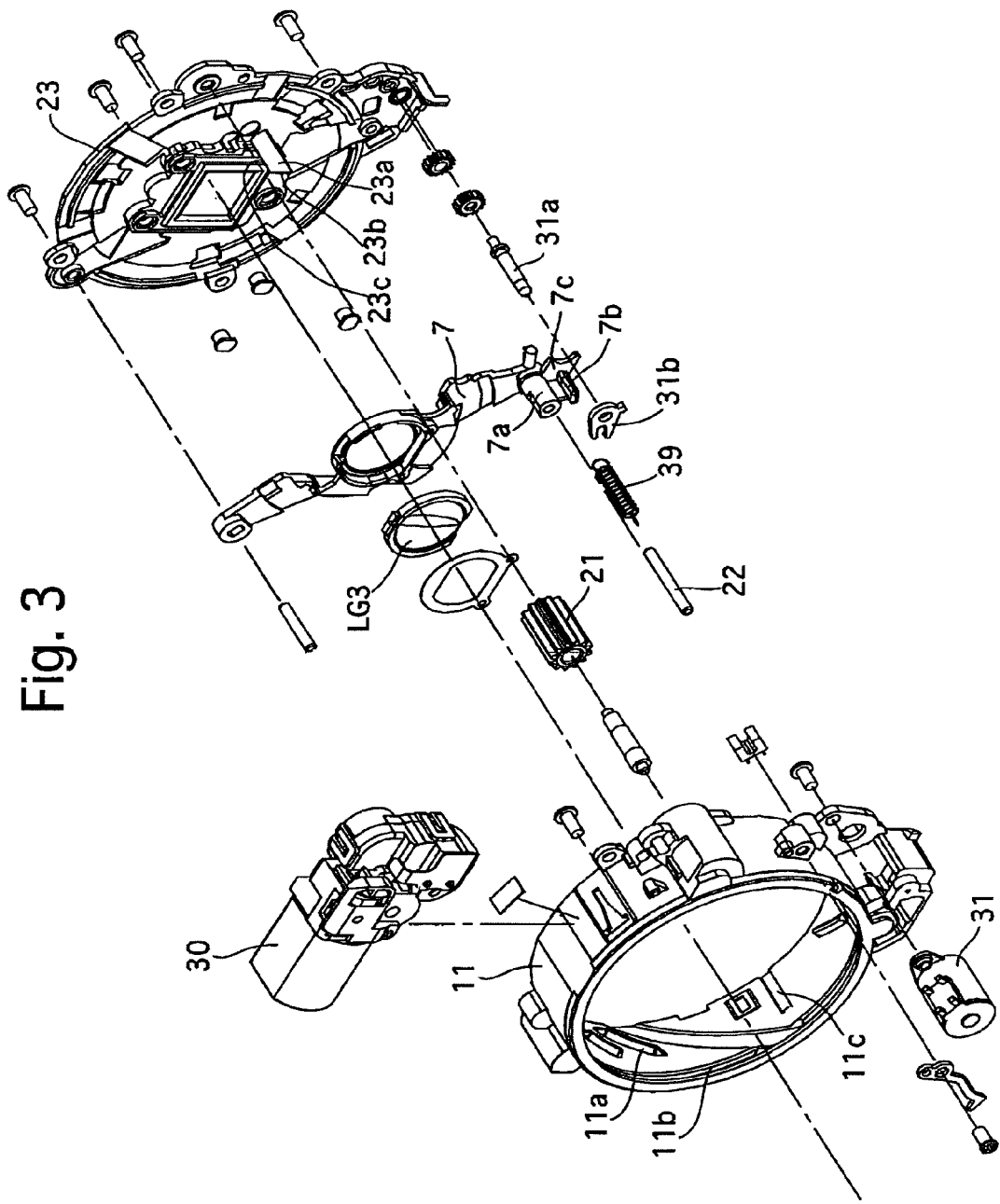
FIG. 3 is an exploded perspective view of some of the main elements of the zoom lens.

As shown in FIG. 3, the zoom lens 1 is provided with a third lens group frame (rear limit member/rear holding member/an element of the advancing/retracting operation control device) 7 which holds the third lens group LG3. The third lens group frame 7 is provided with a hollow-cylindrical advancing/retracting movement guide portion 7a having a through-hole extending in the optical axis direction. The third lens group frame 7 is guided linearly in a direction parallel to the optical axis O (hereinafter referred simply as the optical axis direction) via a guide shaft 22 fixed between the lens barrel housing 11 and the CCD support plate 23 with the guide shaft 22 being inserted into the through-hole of the hollow-cylindrical advancing/retracting movement guide portion 7a to be freely slidable therein. The third lens group frame 7 can be driven forward and rearward by a driving force of an AF motor 31 in the optical axis direction. More specifically, the AF motor 31 rotates a lead screw 31a, and an AF nut 31b is engaged with the lead screw 31a. The AF nut 31b is prevented from rotating about the lead screw 31a by engagement with a guide projection 7b formed on the third lens group frame 7 in the vicinity of the advancing/retracting movement guide portion 7a, so that forward and reverse rotations of the lead screw 31a cause the AF nut 31b to move forward and rearward in the optical axis direction. The third lens group frame 7 is biased forward in the optical axis direction by a third lens group biasing spring 39 extended and installed between the third lens group frame 7 and the lens barrel housing 11. The third lens group biasing spring 39 is an extension coil spring. The third lens group frame 7 is provided, in the vicinity of the advancing/retracting movement guide portion 7a and the guide projection 7b, with a movement control plate 7c, and the biasing force of the third lens group biasing spring 39 causes the movement control plate 7c to come in pressing contact with the AF nut 31b. With this structure, if the AF nut 31b moves forward in the optical axis direction, the third lens group frame 7 follows the forward movement of the AF nut 31b to move forward by the biasing force of the third lens group biasing spring 39. If the AF nut 31b moves rearward in the optical axis direction, the movement control plate 7c is pressed rearward against the biasing force of the third lens group biasing spring 39, so that the third lens group LG3 moves rearward.

The zoom lens 1 is provided inside the lens barrel housing 11 with a helicoid ring 12 which is supported by the lens barrel housing 11 to be rotatable about the optical axis O relative to the lens barrel housing 11. The helicoid ring 12 is provided on an outer peripheral surface thereof with a gear 12a which is in mesh with a zoom gear 21 (see FIGS. 1 through 3). The zoom gear 21 is driven to rotate by a zoom motor 30 (see FIG. 3) to transfer rotational force to the helicoid ring 12. When the zoom lens 1 is in a state between the accommodated state shown in FIG. 1 and the state shown by an upper half of the zoom lens 1 in FIG. 2, in which the zoom lens 1 is set at the wide-angle extremity, the lens barrel housing 11 and the helicoid ring 12 are coupled to each other via helicoid threads, and driving the zoom motor 30 causes the helicoid ring 12 to move in the optical axis direction while rotating while being guided by female helicoidal threads 11a (see FIG. 3) formed on an inner peripheral surface of the lens barrel housing 11 that are engaged in male helicoid threads 12c formed on the outer periphery of the helicoid ring 12. The gear 12a is also formed on the male helicoid threads 12c. On the other hand, when the zoom lens 1 is in a ready-to-photograph state between the wide-angle extremity and the telephoto extremity, the aforementioned helicoid coupling is released, and thereupon projections 12b (see FIG. 4) formed on an outer peripheral surface of the helicoid ring 12 are engaged in a circumferential groove 11b (see FIG. 3) formed on an inner peripheral surface of the lens barrel housing 11 so that the helicoid ring 12 rotates at an axial fixed position, i.e., without moving in the optical axis direction, in accordance with the driving operation of the zoom motor 30. A first advancing barrel 13 which rotates about the optical axis O and moves in the optical axis direction with the helicoid ring 12 is coupled to the front of the helicoid ring 12.

The zoom lens 1 is provided inside the first advancing barrel 13 and the helicoid ring 12 with a first linear guide ring 14. The first linear guide ring 14 is guided linearly in the optical axis direction by engagement of linear guide grooves 11c formed on an inner peripheral surface of the lens barrel housing 11 with linear guide projections 14a which project radially outwards from the rear end of the first linear guide ring 14. The first linear guide ring 14 is engaged with the first advancing barrel 13 and the helicoid ring 12 to move with the first advancing barrel 13 and the helicoid ring 12 in the optical axis direction and to be allowed to rotate relative to the first advancing barrel 13 and the helicoid ring 12.

Figure 4:
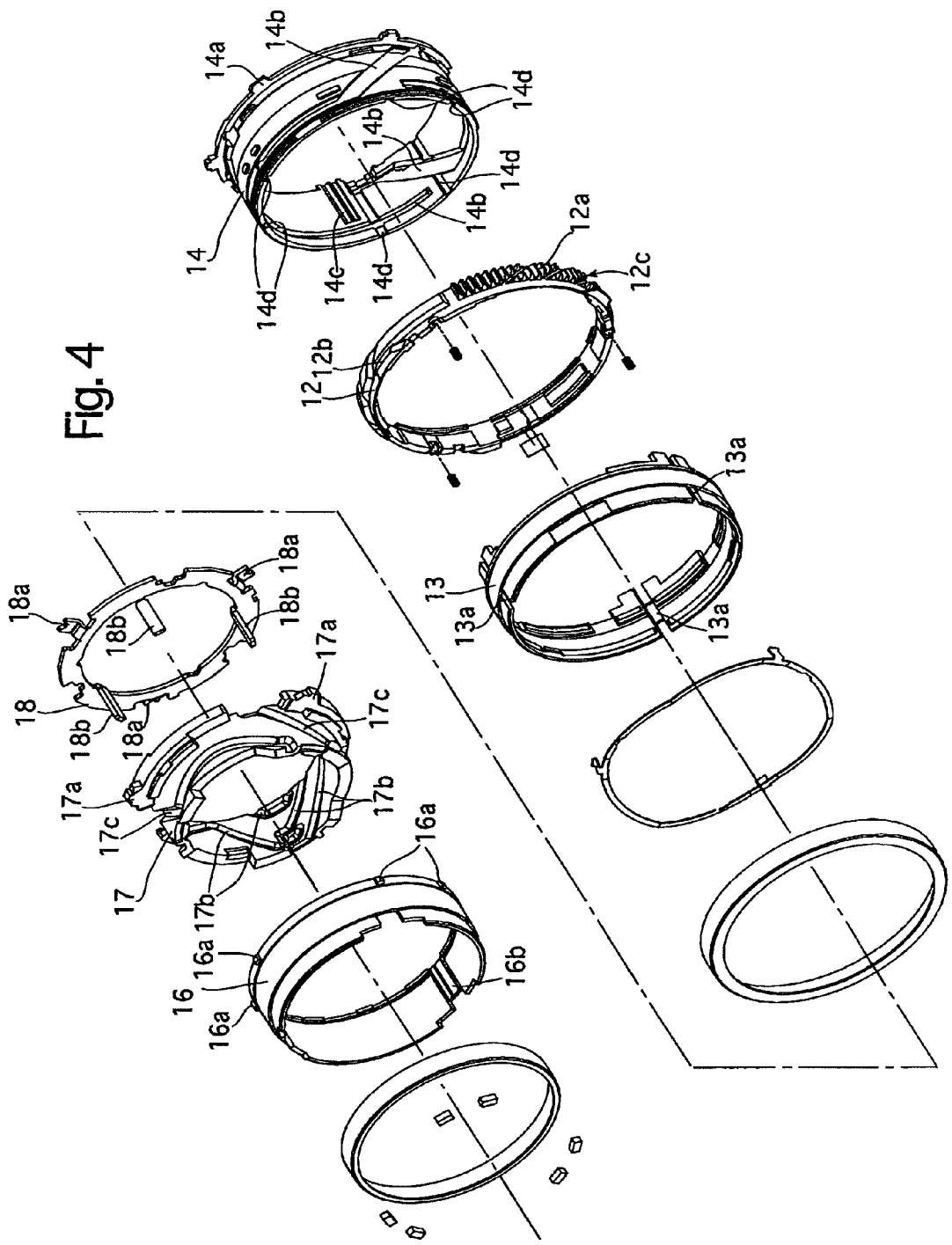
FIG. 4 is an exploded perspective view of some other main elements of the zoom lens.

As shown in FIG. 4, the first linear guide ring 14 is provided with a set of three guide slots (through grooves) 14b which are formed through inner and outer peripheral surfaces of the first linear guide ring 14. A cam ring 17 is provided radially inside the first linear guide ring 14 and is provided with set of three radially outer projections 17a at different circumferential positions thereon to project radially outwards. Each guide slot 14b is provided with a lead groove portion inclined relative to the optical axis O and a circumferential groove portion about the optical axis O, and the set of three radially outer projections 17a formed on an outer peripheral surface of the cam ring 17 are slidably engaged in the set of three guide slots 14b, respectively. The set of three radially outer projections 17a are further engaged in a set of three rotation transfer grooves 13a which are formed on an inner peripheral surface of the first advancing barrel 13 to extend parallel to the optical axis O, so that the cam ring 17 rotates with the first advancing barrel 13. The cam ring 17 advances and retracts in the optical axis direction while rotating while being guided by the lead groove portions of the three guide slots 14b when each radially outer projection 17a engages in the lead groove portion of the associated guide slot 14b, and rotates at an axial fixed position, i.e., without moving in the optical axis direction, relative to the first advancing barrel 13 and the first linear guide ring 14 when each radially outer projection 17a engages in the circumferential groove portion of the associated guide slot 14b. Similar to the helicoid ring 12, the cam ring 17 moves forward and rearward in the optical axis direction while rotating when the zoom lens 1 is in a state between the accommodated state and the ready-to-photograph state at the wide-angle extremity, and rotates at an axial fixed position when the zoom lens 1 is in the ready-to-photograph state between the wide-angle extremity and the telephoto extremity.

The first linear guide ring 14 is provided on an inner peripheral surface thereof with a plurality of first linear grooves 14c and a plurality of second linear grooves 14d both of which extend in the optical axis direction. The zoom lens 1 is provided radially inside the first advancing barrel 13 with a second linear guide ring 18. The second linear guide ring 18 is provided with a plurality of linear guide projections 18a which project radially outwards to be engaged in the plurality of first linear grooves 14c of the first linear guide ring 14 to be freely slidable therein, respectively. The zoom lens 1 is provided immediately inside the first advancing barrel 13 with a second advancing barrel 16 which advances and retracts relative to the first advancing barrel 13. The second advancing barrel 16 is provided with a plurality of linear guide projections 16a which project radially outwards to be engaged in the plurality of second linear grooves 14d of the first linear guide ring 14, respectively. Due to the engagement of the linear guide projections 18a with the first linear grooves 14c and the engagement of the linear guide projections 16a with the second linear grooves 14d, each of the second linear guide ring 18 and the second advancing barrel 16 is guided linearly in the optical axis direction. Each of the second linear guide ring 18 and the second advancing barrel 16 is supported to be rotatable relative to the cam ring 17 about the optical axis O and to move with the cam ring 17 in the optical axis direction.

The second linear guide ring 18 is provided with a set of three linear guide keys 18b which project forward. The zoom lens 1 is provided immediately inside the cam ring 17 with a second lens group moving frame (support ring) 8 which is guided linearly in the optical axis direction. The second linear guide ring 18 guides the second lens group moving frame 8 linearly in the optical axis direction with the set of three linear guide keys 18b being slidably engaged in a set of three linear grooves 8a formed on an outer peripheral surface of the second lens group moving frame 8. The second lens group moving frame 8 supports the second lens group LG2 via a second lens group frame (swingable member/first holding member) 6. The second lens group frame 6 is positioned inside the second lens group moving frame 8 and supported thereby to be swingable about an axis of rotation parallel to the optical axis O.

The zoom lens 1 is provided immediately inside the second advancing barrel 16 with a third advancing barrel 19 which advances and retracts relative to the second advancing barrel 16. The second advancing barrel 16 is provided on an inner peripheral surface thereof with a set of three linear guide grooves 16b which are parallel to the optical axis O, and the third advancing barrel 19 is provided with a set of three linear guide projections 19a which project radially outwards to be engaged in the set of three linear guide grooves 16b of the second advancing barrel 16 to be freely slidable therein, respectively. Due to the engagement of the linear guide projections 19a with the linear guide grooves 16b, the third advancing barrel 19 is also guided linearly in the optical axis direction. The third advancing barrel 19 supports the first lens group LG1 therein via a first lens group support ring 5 and a first lens group frame 4.

The cam ring 17 is provided on an inner peripheral surface thereof with a plurality of second-lens-group control cam grooves 17b for guiding the second lens group LG2, and the second lens group moving frame 8 is provided on an outer peripheral surface thereof with a corresponding plurality of cam followers 8b for moving the second lens group LG2 which are engaged in the plurality of second-lens-group control cam grooves 17b, respectively. The second lens group moving frame 8 is guided linearly in the optical axis direction via the second linear guide ring 18, and accordingly, a rotation of the cam ring 17 causes the second lens group moving frame 8, i.e., the second lens group LG2, to move in the optical axis direction in a predetermined moving manner in accordance with the contours of the second-lens-group control cam grooves 17b.

A set of three cam followers 19b (see FIG. 6) for guiding the first lens group LG1 are fixed to the third advancing barrel 19 and project radially inwards to be slidably engaged in a set of three first-lens-group control cam grooves 17c formed on an outer peripheral surface of the cam ring 17, respectively. The third advancing barrel 19 is guided linearly in the optical axis direction via the second advancing barrel 16, and accordingly, a rotation of the cam ring 17 causes the third advancing barrel 19, i.e., the first lens group LG1, to move in the optical axis direction in a predetermined moving manner in accordance with the contours of the first-lens-group control cam grooves 17c.

The zoom lens 1 is provided between the second lens group moving frame 8 and the third advancing barrel 19 with a pair of inter-lens-group biasing springs 32 (see FIG. 5) which are extended and installed therebetween. The second lens group moving frame 8 and the third advancing barrel 19 are biased in opposite directions toward each other by the pair of inter-lens-group biasing springs 32 to eliminate backlash between the plurality of second-lens-group control cam grooves 17b and the plurality of cam followers 8b and backlash between the set of three cam followers 19b and the set of three first-lens-group control cam grooves 17c, which enhances the accuracy of engagement between the plurality of second-lens-group control cam grooves 17b and the plurality of cam followers 8b and the accuracy of engagement between the set of three cam followers 19b and the set of three first-lens-group control cam grooves 17c.

In the above described zoom lens 1, the efficiency of space utilization for the optical elements supported by the second lens group moving frame 8 such as the second lens group LG2, the shutter S and the adjustable diaphragm A has been enhanced to achieve a reduction in length of the zoom lens 1 in the accommodated state thereof. The structure of the zoom lens 1 to achieve this reduction will be discussed in detail hereinafter.

Figure 5:
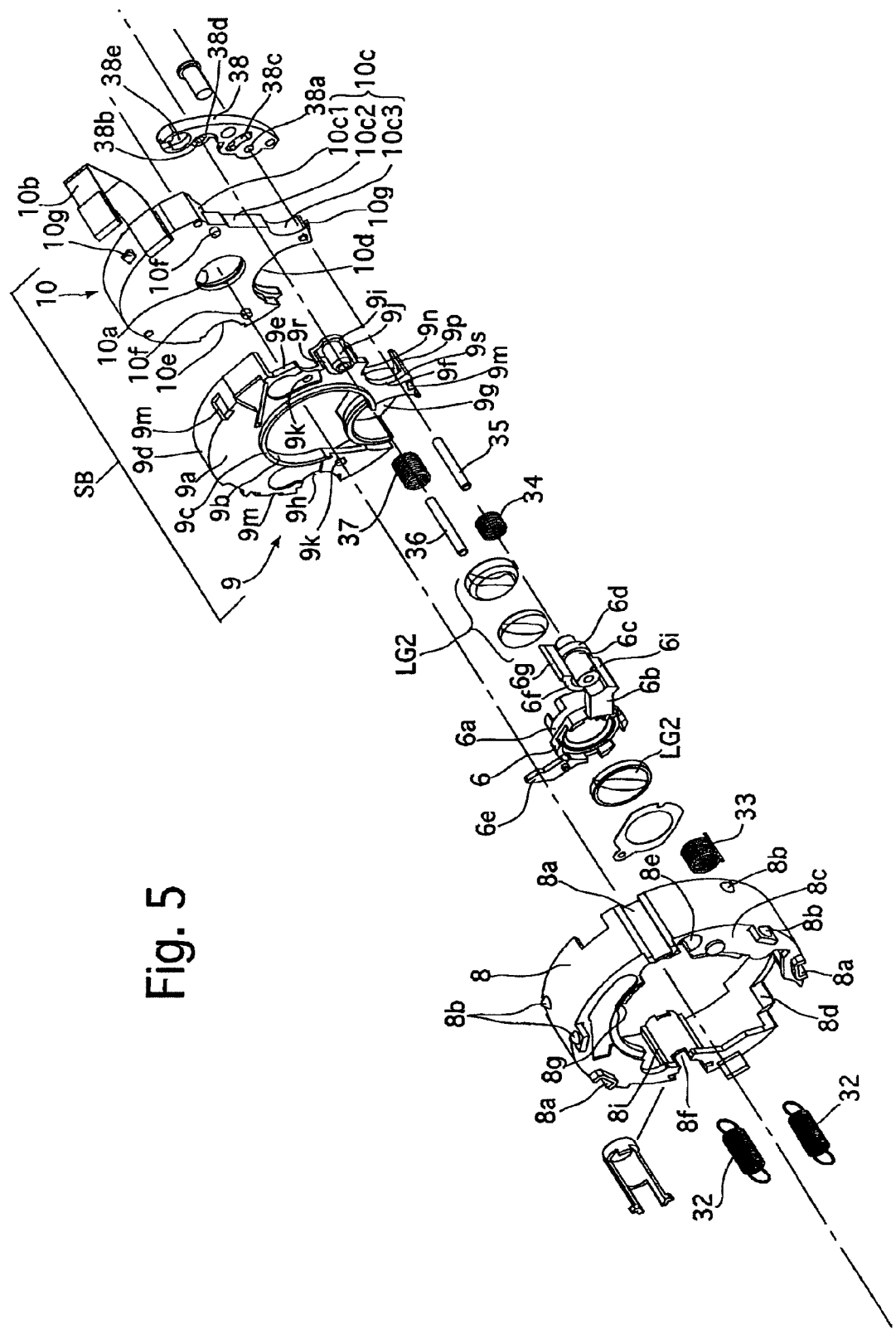
FIG. 5 is an exploded perspective view of some other main elements of the zoom lens.
Figure 6:
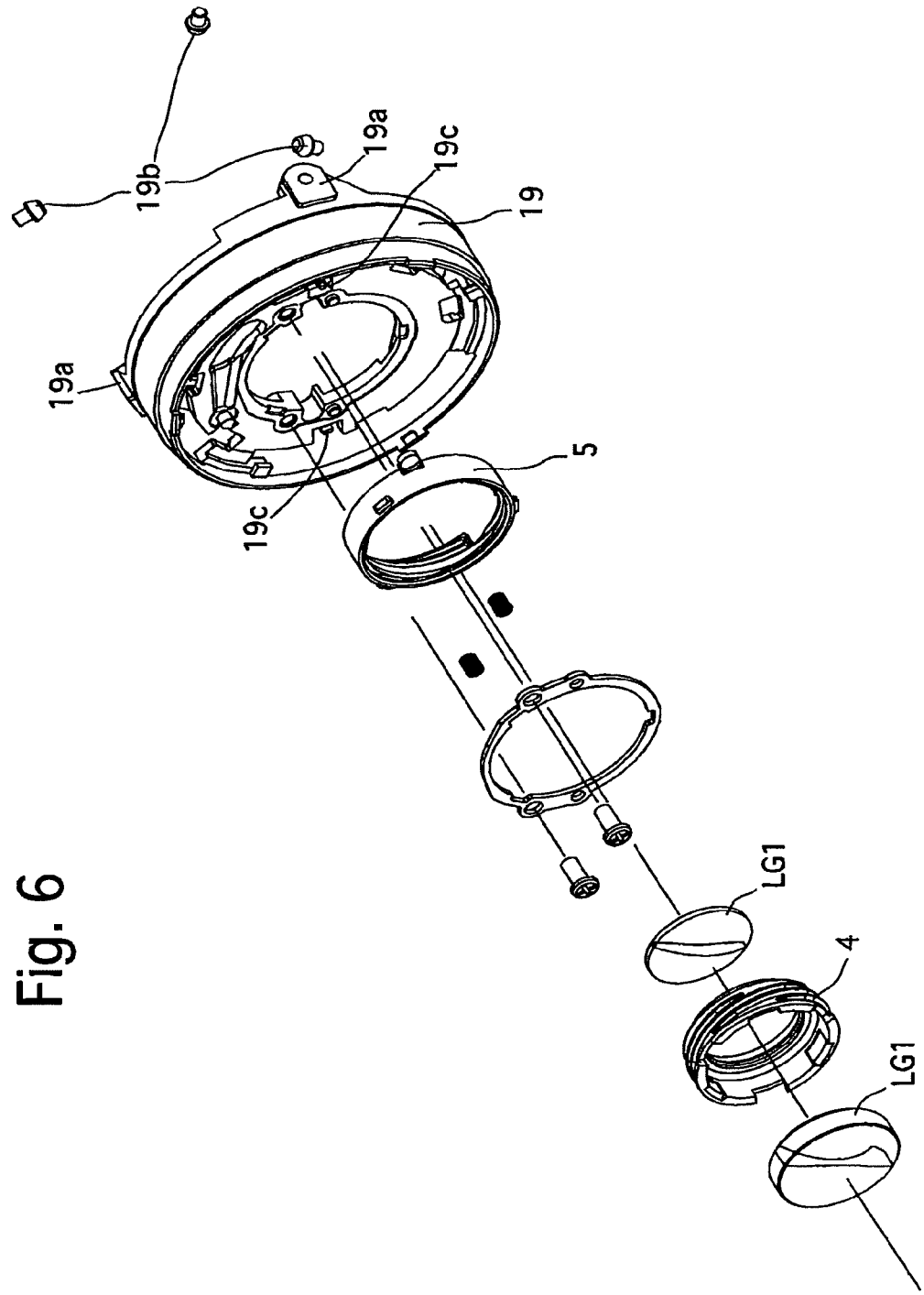
FIG. 6 is an exploded perspective view of some other main elements of the zoom lens.

As shown in FIG. 5, the second lens group moving frame 8 is provided in the vicinity of the front end thereof with a radially inner flange 8c, and a retaining plate 38 is installed behind the radially inner flange 8c. Two bearing holes (lower and upper bearing holes) 38a and 38b are formed on the retaining plate 38, while a bearing hole (lower bearing hole; not shown) and a bearing hole (upper bearing hole) 8h (see FIGS. 17 through 21) are formed on the inner flange portion 8c so as to face the two bearing holes 38a and 38b, respectively. A portion of the retaining plate 38 around the bearing hole 38b is recessed rearward in the optical axis direction to serve as a movement limit recessed portion (an element of a movement limit device) 38d. One end and the other end of a pivot shaft 35 for the second lens group frame 6 are respectively inserted into the lower bearing hole 38a of the retaining plate 38 and the lower bearing hole (not shown) of the radially inner flange 8c, which faces the lower bearing hole 38a. One end and the other end of a shutter guide shaft 36 are respectively inserted into the upper bearing hole 38b of the retaining plate 38 and the upper bearing hole 8h of the radially inner flange 8c, which faces the upper bearing hole 38b. In this supported state, the axes of the pivot shaft 35 and the shutter guide shaft 36 are substantially parallel to the optical axis O.

Figure 8:
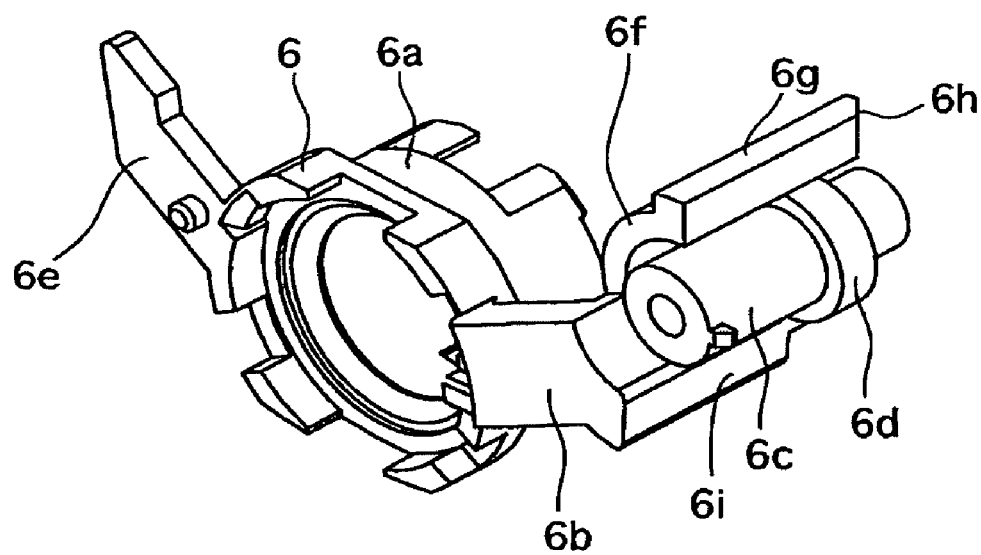
FIG. 8 is a front perspective view of a second lens group frame of the zoom lens.
Figure 9:
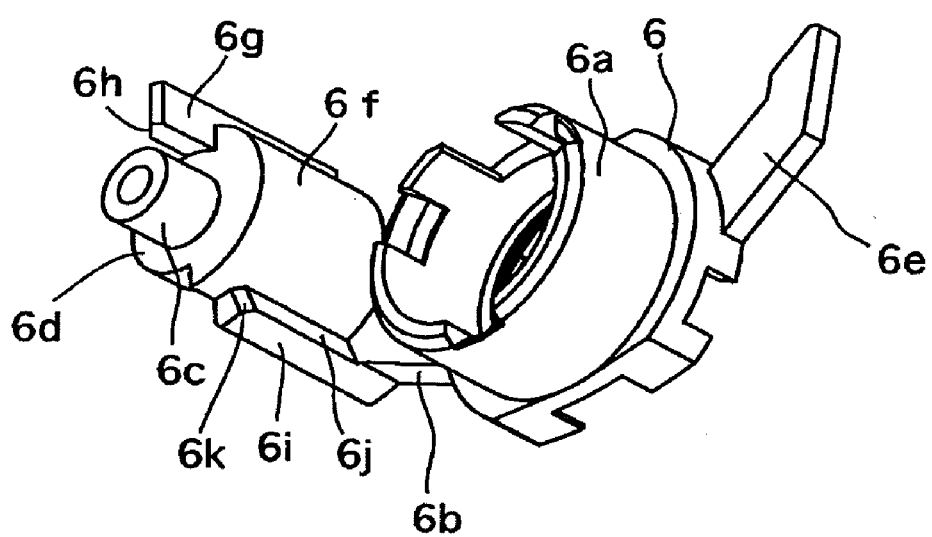
FIG. 9 is a rear perspective view of the second lens group frame of the zoom lens.

As shown in FIGS. 8 and 9, the second lens group frame 6 is provided with a cylindrical lens holder 6a, a swing arm 6b and a pivoted cylindrical portion 6c. The cylindrical lens holder 6a holds the second lens group LG2. The swing arm 6b extends in a radial direction of the cylindrical lens holder 6a, and the pivoted cylindrical portion 6c is formed at the free end (opposite end) of the swing arm 6b. A through-hole is formed through the pivoted cylindrical portion 6c in the optical axis direction (i.e., the axis of the through-hole is substantially parallel to the optical axis O), and the pivot shaft 35 is inserted into this through-hole so that the second lens group frame 6 can freely swing about the pivot shaft 35. The front and rear ends of the pivoted cylindrical portion 6c are held between the radially inner flange 8c of the second lens group moving frame 8 and the retaining plate 38 to be prevented from moving in the axial direction of the pivoted cylindrical portion 6c, i.e., in the optical axis direction. The second lens group frame 6 is biased forward by a second-lens-group-frame biasing spring (compression coil spring) 34 installed between a middle flange 6d on the pivoted cylindrical portion 6c and the retaining plate 38 to be held at a fixed position in the optical axis direction relative to the second lens group moving frame 8.

Inside the second lens group moving frame 8, the second lens group LG2, which is fixed to the cylindrical lens holder 6a of the second lens group frame 6, is moved in a plane orthogonal to the optical axis O between a photographing position (on-axis position) shown in FIGS. 2, 14, 16, 20 and 21, in which the optical axis (center) of the second lens group LG2 coincides with the optical axis O, and an off-axis displaced position (radially retracted away from the optical axis O) shown in FIGS. 1, 10 through 13, 15, and 17 through 19, in which the optical axis (center) of the second lens group LG2 is eccentrically downwardly positioned with respect to the optical axis O, by swing motion of the second lens group frame 6 about the pivot shaft 35. The second lens group frame 6 is provided with a stopper arm 6e engageable with a stopper 8g (see FIGS. 5 and 10) formed on a radially inner side of the second lens group moving frame 8. The stopper arm 6e comes in contact with the stopper 8g to determine the position of the second lens group frame 6 when the second lens group frame 6 is moved to the photographing position thereof.

A second-lens-group-frame returning spring (an element of the inserting/displacing-operation control device/biasing member) 33 is supported on an outer peripheral surface of the pivoted cylindrical portion 6c of the second lens group frame 6. The second-lens-group-frame returning spring 33 is a coiled torsion spring which includes a coiled portion and a pair of spring end portions, wherein the coiled portion surrounds the pivoted cylindrical portion 6c and the pair of spring end portions respectively extend from the opposite ends of the coiled portion. One of the pair of spring end portions of the second-lens-group-frame returning spring 33 is engaged with a portion of the second lens group frame 6 in the vicinity of the swing arm 6b, while the other spring end portion of the second-lens-group-frame returning spring 33 is engaged with a spring-engaging hole 8j (see FIG. 10) formed in the second lens group moving frame 8. The second lens group frame 6 is biased to rotate toward the photographing position thereof by the second-lens-group-frame returning spring 33.

The second lens group frame 6 is provided with a large-diameter semi-cylindrical portion 6f which partly surrounds the periphery of the pivoted cylindrical portion 6c, and is further provided with a position control projection 6g which projects radially outwards from the large-diameter semi-cylindrical portion 6f. The second lens group frame 6 is provided at the rear end of the position control projection 6g with a rear-end inclined surface 6h which is inclined to a plane orthogonal to the optical axis O. The CCD support plate 23 is provided with a second-lens-group-displacing control projection (an element of the inserting/displacing-operation control device/displacement guide portion) 23a for controlling the position of the second lens group frame 6 by engaging with the position control projection 6g. The second-lens-group-displacing control projection 23a is formed to project forward in the optical axis direction in the vicinity of the position where the CCD image sensor 24 is supported by the CCD support plate 23. The second-lens-group-displacing control projection 23a is provided at the front end thereof with an inclined displacing surface (cam surface) 23b. The inclined displacing surface 23b is inclined so as to gradually increase the amount of projection of the second-lens-group-displacing control projection 23a toward the front in the optical axis direction in a direction away from the center of the CCD support plate 23 that supports the CCD image sensor 24. A side surface 23c of the second-lens-group-displacing control projection 23a which is continuous with the inclined displacing surface 23b is a surface parallel to the optical axis O. A projection insertion hole (through-hole) 38c which allows the second-lens-group-displacing control projection 23a to enter is formed through the retaining plate 38.

The second lens frame 6 is held in the aforementioned photographing position by the biasing force of the second lens group frame returning spring 33 in a state where no external force is applied to the position control projection 6g. Thereafter, when the second lens group frame 6 approaches the CCD support plate 23 following a rearward movement of the second lens group moving frame 8, the second-lens-group-displacing control projection 23a approaches the position control projection 6g through the projection insertion hole 38c so that the inclined displacing surface 23b comes into contact with the rear-end inclined surface 6h. Thereupon, a component force in a rotation direction is produced from the moving force in the optical axis direction, so that the second lens group frame 6 is rotated toward the aforementioned off-axis displaced position against the biasing force of the second lens group frame returning spring 33. When the second lens group frame 6 is in the off-axis displaced position as a result of this rotation, the second lens group frame 6 partly enters a cutout 8d (see FIGS. 5 and 10) formed through the second lens group moving frame 8 but does not project radially outward from the second lens group moving frame 8, thus not interfering with the cam ring 17 that is positioned radially outside the second lens group moving frame 8.

The second lens group moving frame 8 is provided, at positions not interfering with the space in which the second lens group frame 6 swings, with a pair of spring accommodation portions 8e and 8f in which the pair of inter-lens-group biasing springs 32 are inserted, respectively. The retaining plate 38 has a spring insertion hole 38e positioned on a line extended from the spring accommodation portion 8e in the optical axis direction. Each inter-lens-group biasing spring 32 is made of an extension coil spring. The rear ends of the pair of inter-lens-group biasing springs 32 are hooked on spring hooks (not shown) formed at the rear ends of the pair of spring accommodation portions 8e and 8f, respectively, with one of the pair of inter-lens-group biasing springs 32 (the upper inter-lens-group biasing spring 32 with respect to FIG. 5) being inserted into the associated spring accommodation portion 8e and the spring insertion hole 38e of the retaining plate 38 and with the other inter-lens-group biasing spring 32 (the lower inter-lens-group biasing spring 32 with respect to FIG. 5) being inserted into the associated spring accommodation portion 8f. The front ends of the pair of inter-lens-group biasing springs 32 are extended forward from the second lens group moving frame 8 to be hooked on spring hooks 19c (see FIG. 6) formed on the third advancing barrel 19, respectively.

As an element independent of the second lens group frame 6, the zoom lens 1 is provided with a shutter sub-unit (holding member for an advancing/retracting optical element/second holding member) 10 containing the shutter S and the adjustable diaphragm A. The shutter sub-unit 10 is supported by the second lens group moving frame 8 via a shutter support ring (holding member for an advancing/retracting optical element/second holding member) 9. As shown in FIG. 5, the shutter sub-unit 10 has a shutter aperture (photographing aperture) 10a the aperture size of which is changed by the shutter S and the adjustable diaphragm A. Actuators (not shown) for the shutter S and the adjustable diaphragm A are built into a housing of the shutter sub-unit 10 which surrounds the shutter aperture 10a. A flexible printed wiring board 10b for transmission of actuating signals to the actuators is extended from the shutter sub-unit 10.

A step-shaped side cutout portion 10c shaped to prevent the shutter sub-unit 10 from interfering with a portion of the second lens group frame 6 in the vicinity of the pivoted cylindrical portion 6c and the retaining plate 38 is formed on the periphery of the shutter sub-unit 10. The side cutout portion 10c is broadly divided into the following three sections: an upper cutout portion 10c1, a middle cutout portion 10c2 and a lower cutout portion 10c3. The upper cutout portion 10c1 is positioned to correspond to each of the spring accommodation portion 8e of the second lens group moving frame 8 and the spring insertion hole 38e of the retaining plate 38, the middle cutout portion 10c2 is positioned on a line extended from the shutter guide shaft 36, and the lower cutout portion 10c3 is positioned on a line extended from the pivot shaft 35. The lower cutout portion 10c3 is shaped so as to have a semicircular cross section which is greater in diameter than the large-diameter semi-cylindrical portion 6f. The shutter sub-unit 10 is further provided on the periphery thereof with a lower recessed portion 10d and a side cutout portion 10e. The lower recessed portion 10d is positioned to correspond to the cylindrical lens holder 6a of the second lens group frame 6 when it is in the aforementioned off-axis displaced position, and the side cutout portion 10e is positioned to correspond to the spring accommodation portion 8f of the second lens group moving frame 8.

Figure 7:
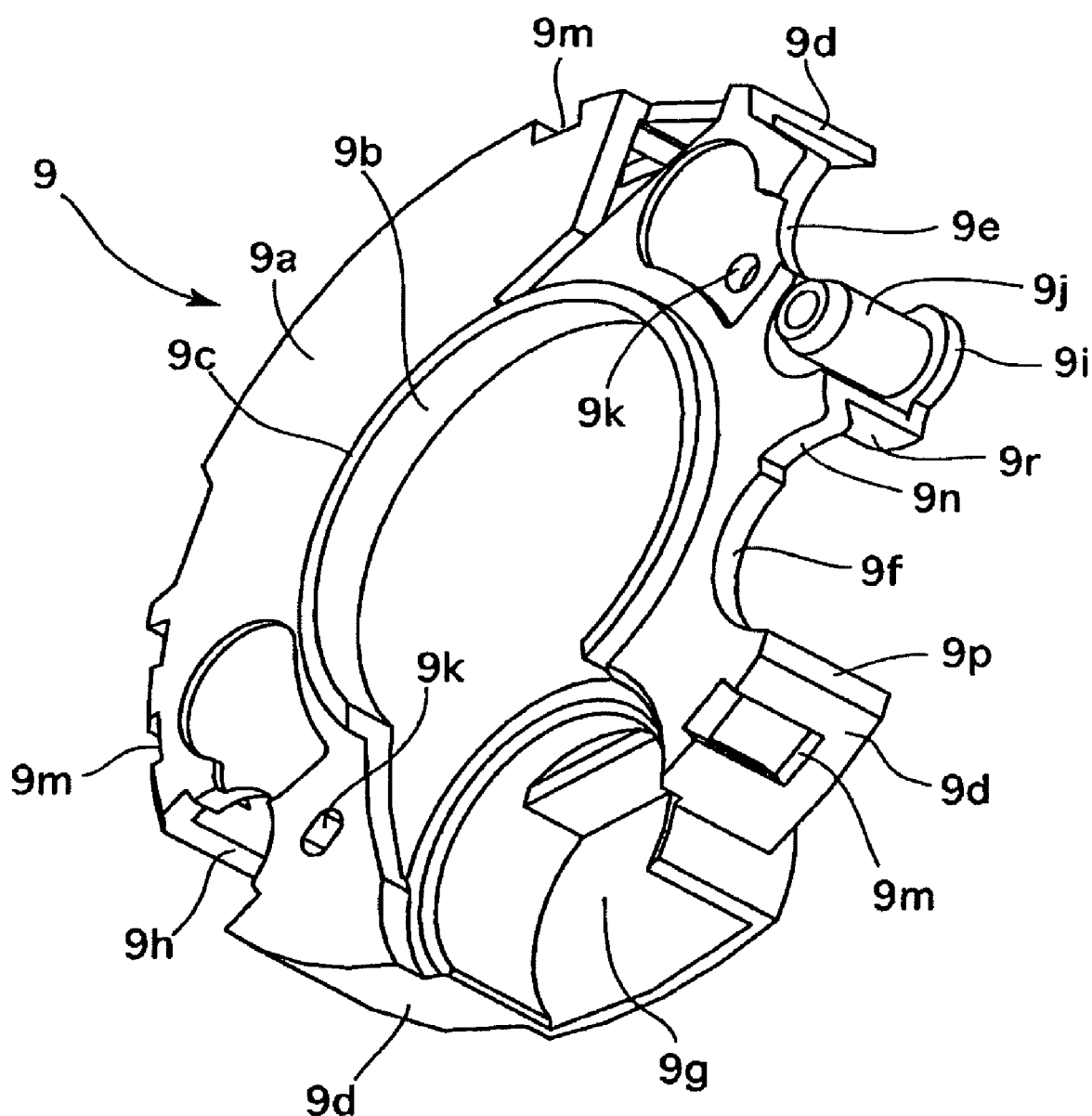
FIG. 7 is a front perspective view of a shutter support ring of the zoom lens.

As shown in FIGS. 5 and 7, the shutter support ring 9 that supports the shutter sub-unit 10 is provided with a front flange portion 9a with which the front surface of the shutter sub-unit 10 comes in contact, and is provided at the center of the front flange portion 9a with a front aperture 9b which is greater in diameter than the shutter aperture 10a of the shutter sub-unit 10. The shutter support ring 9 is provided along the edge of the front aperture 9b with a front-end annular rib 9c which projects forward in the optical axis direction. The shutter support ring 9 is provided with a partial cylindrical portion 9d which extends rearward in the optical axis direction along the inner peripheral surface of the second lens group moving frame 8 from an outer edge of the front flange portion 9a. The shutter support ring 9 is provided on the periphery thereof with a first cutout portion 9e, a second cutout portion 9f, a second lens group accommodation recess (accommodation portion) 9g (see FIG. 7) and a third cutout portion 9h, each of which is formed in a manner to cut out part of the partial cylindrical portion 9d. The second cutout portion 9f is shaped into a semicircular cutout which is greater in diameter than the large-diameter semi-cylindrical portion 6f of the second lens group frame 6. The shutter support ring 9 is provided between the first cutout portion 9e and the second cutout portion 9f with a movement limit plate (an element of the movement limit device) 9i positioned rearwardly from the front flange portion 9a in the optical axis direction, and is further provided with an advancing/retracting support cylinder 9j which projects forward in the optical axis direction from the movement limit plate 9i. The shutter support ring 9 is provided between the movement limit plate 9i and the front flange portion 9a with a semi-cylindrical connecting wall 9r which partly surrounds the advancing/retracting support cylinder 9j and via which the movement limit plate 9i and the front flange portion 9a are connected to each other.

When the shutter sub-unit 10 is installed into the shutter support ring 9, two positioning bosses 10f formed on the front of the shutter sub-unit 10 are fitted into two engaging holes 9k formed on the front flange portion 9a of the shutter support ring 9, respectively, while three positioning projections 10g formed on an outer peripheral surface of the shutter sub-unit 10 are fitted into three engaging holes 9m formed on the partial cylindrical portion 9d of the shutter support ring 9, respectively. Upon the shutter sub-unit 10 being installed to the shutter support ring 9 in this manner, the lower recessed portion 10d is fitted on a portion of the shutter support ring 9 in which the second lens group accommodation recess 9g is formed (see FIG. 7), from behind in the optical axis direction. In addition, the first cutout portion 9e and the upper cutout portion 10c1 are aligned in the optical axis direction to become a continuous cutout portion, the second cutout portion 9f and the lower cutout portion 10c3 are aligned in the optical axis direction to become a continuous cutout portion, the third cutout portion 9h and the side cutout portion 10e are aligned in the optical axis direction to become a continuous cutout portion. The connecting wall 9r of the shutter support ring 9 is positioned beside the middle cutout portion 10c2 of the shutter sub-unit 10.

The shutter guide shaft 36 is slidably inserted into a guide hole (through-hole) formed through the advancing/retracting support cylinder 9j at the center thereof. A shutter unit SB that is a combination of the shutter sub-unit 10 and the shutter support ring 9 is supported by the second lens group moving frame 8 therein via the shutter guide shaft 36 to be movable in the optical axis direction by the guidance of the shutter guide shaft 36. Additionally, the second lens group moving frame 8 is provided, on an inner peripheral part thereof on the spring accommodation portion 8f, with a rail-shaped portion 8i (see FIG. 5) which extends in the optical axis direction and has a uniform cross-sectional shape, and part of the third cutout portion 9h of the shutter support ring 9 and part of the side cutout portion 10e of the shutter sub-unit 10 are slidably engaged with the rail-shaped portion 8i. Due to this slidable engagement, the shutter unit SB is prevented from rotating relative to the second lens group moving frame 8.

A shutter unit press spring (biasing member/an element of an advancing/retracting operation control device) 37 in the form of a compression coil spring is installed between the movement limit plate 9i of the shutter support ring 9 and the radially inner flange 8c of the second lens group moving frame 8 with the shutter unit SB being supported by the second lens group moving frame 8. As shown in FIGS. 17 through 21, the shutter unit press spring 37 is accommodated in a radial space between the shutter guide shaft 36 and the connecting wall 9r. The shutter support ring 9 is biased, via the shutter unit press spring 37, in a direction to move rearward in the optical axis direction relative to the second lens group moving frame 8. Additionally, the rear movement limit of the shutter unit SB inside the second lens group moving frame 8 is determined by the engagement of the movement limit plate 9i of the shutter support ring 9 with the movement limit recessed portion 38d of the retaining plate 38. Contacting surfaces of the movement limit plate 9i and the movement limit recessed portion 38d are formed as flat surfaces substantially orthogonal to the optical axis O.

The combination of the second cutout portion 9f and the lower cutout portion 10c3 serves as a recess (clearance recess) which prevents the shutter unit SB from interfering with the second lens group 6 (specifically the large-diameter semi-cylindrical portion 6f of the pivoted cylindrical portion 6c) when the shutter unit SB changes the position thereof in the optical axis direction in the second lens group moving frame 8. In addition, the combination of the first cutout portion 9e and the upper cutout portion 10c1 serves as a recess (clearance recess) which prevents the shutter unit SB from interfering with the spring accommodation portion 8e of the second lens group moving frame 8 when the shutter unit SB changes the position thereof in the optical axis direction in the second lens group moving frame 8, and the combination of the third cutout portion 9h and the side cutout portion 10e serves as a recess (clearance recess) which prevents the shutter unit SB from interfering with the spring accommodation portion 8f of the second lens group moving frame 8 when the shutter unit SB changes the position thereof in the optical axis direction in the second lens group moving frame 8. As described above, the combination of the third cutout portion 9h and the side cutout portion 10e also has the capability of preventing the shutter unit SB from rotating by the slidable engagement of the third cutout portion 9h and the side cutout portion 10e with the rail-shaped portion 8i, that is positioned on the back of the spring accommodation portion 8f.

Figure 15:
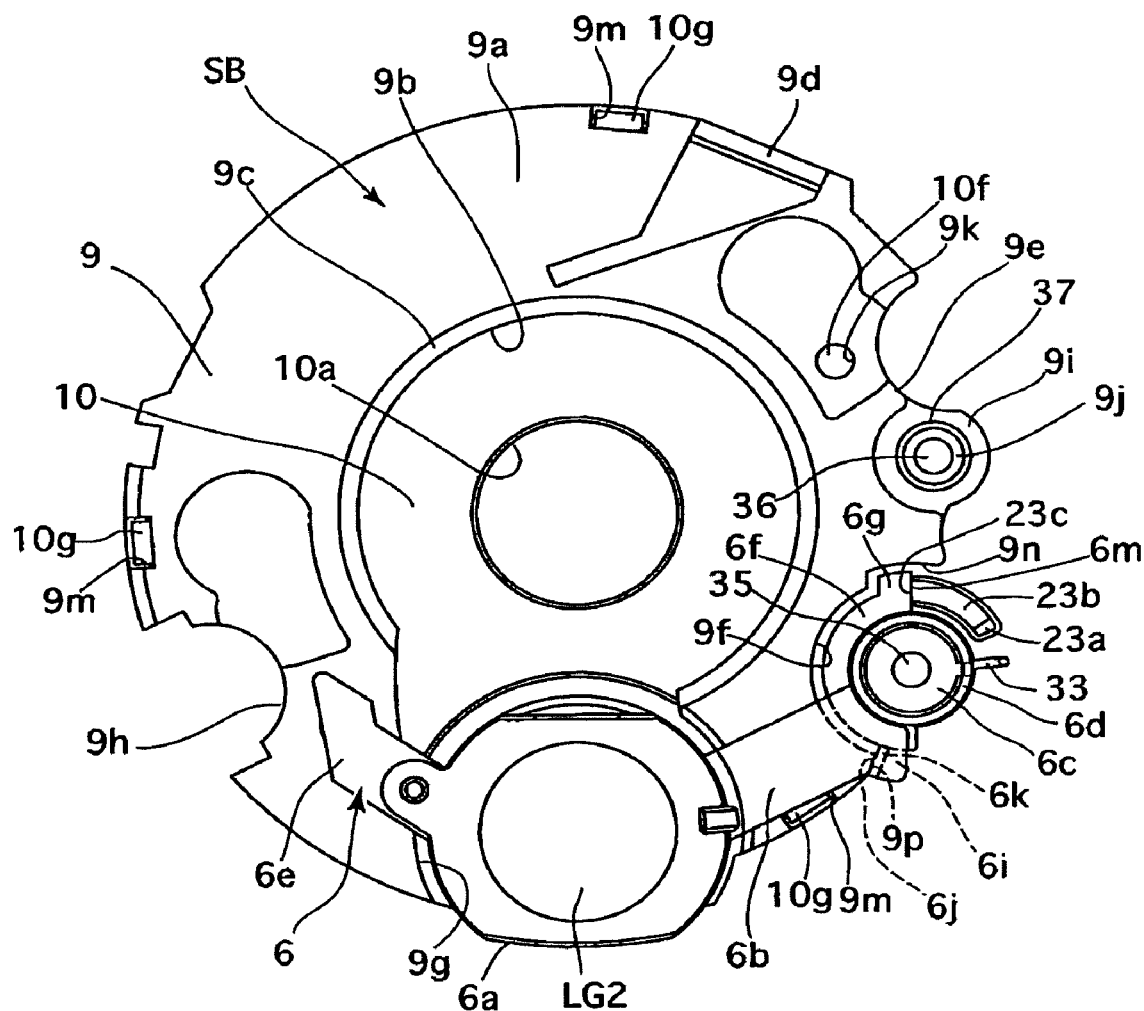
FIG. 15 is a front elevational view of elements positioned in the second lens group moving frame in the accommodated state of the zoom lens.
Figure 16:
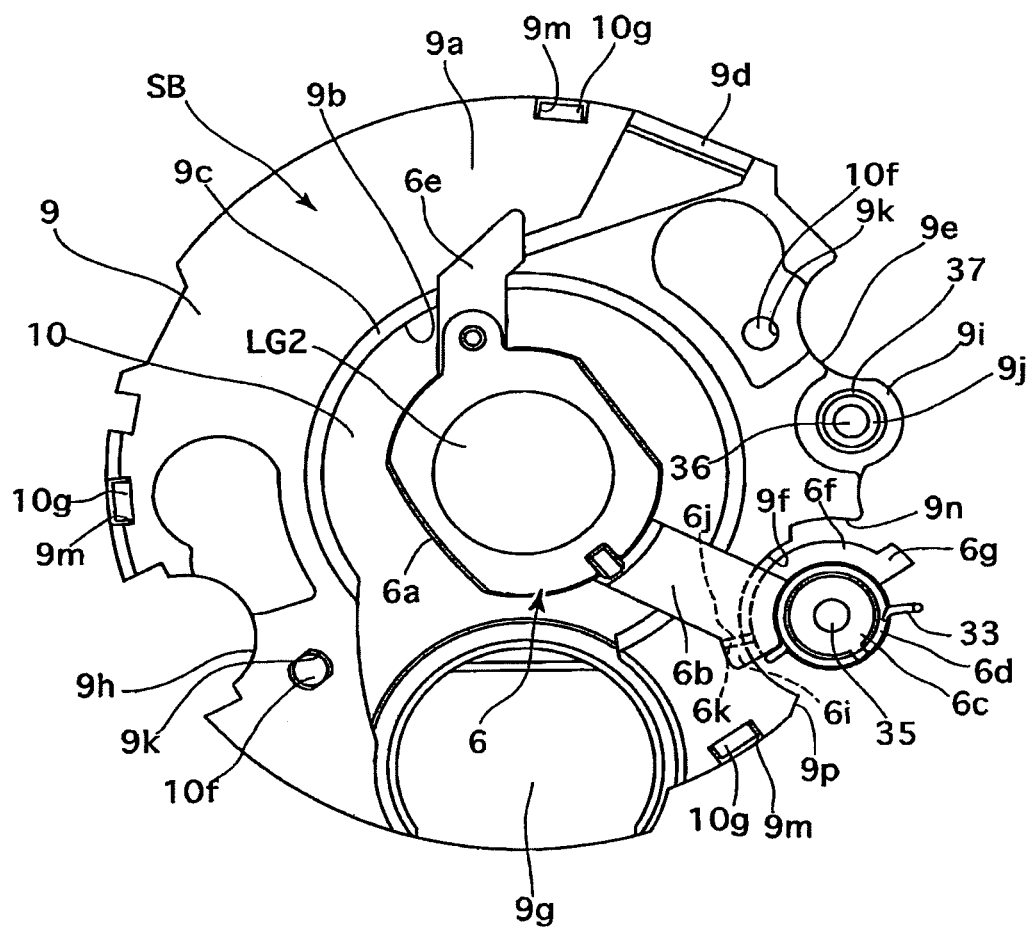
FIG. 16 is a view corresponding to that of FIG. 15, showing the elements shown in FIG. 15 in a ready-to-photograph state of the zoom lens.

As shown in FIGS. 15 and 16, the second cutout portion 9f of the shutter support ring 9 is shaped along an outer peripheral surface of the large-diameter semi-cylindrical portion 6f of the second lens group frame 6, and the shutter support ring 9 is provided in the vicinity of the upper end of the second cutout portion 9f with a recess 9n which prevents the shutter support ring 9 from interfering with the position control projection 6g of the second lens group frame 6. The shutter support ring 9 is further provided, on a portion thereof adjoining to the lower end of the second cutout portion 9f, with a rotation limit surface (an element of a displaced position holding device) 9p which is elongated in the optical axis direction. The rotation limit surface 9p is a flat surface parallel to the optical axis O and lies in a plane which extends in a substantially radial direction from the pivot shaft 35 (see FIGS. 15 and 16).

The second lens group frame 6 is provided, at a position different from the position of the position control projection 6g that is provided for engagement with the second-lens-group-displacing control projection 23a, with a rotation limit projection (an element of the displaced position holding device) 6i which projects radially outwards. As shown in FIG. 9, the second lens group 6 is provided on a side of the rotation limit projection 6i with a rotation limit surface (an element of the displaced position holding device) 6j elongated in the optical axis direction. The rotation limit surface 6j is a flat surface parallel to the optical axis O and lies in a plane which extends in a substantially radial direction from the pivot shaft 35 (see FIGS. 15 and 16). The second lens group frame 6 is provided between the rear end of the rotation limit projection 6i and the rotation limit surface 6j with an inclined surface (displacing-operation assist portion) 6k which is inclined to the optical axis direction.

Operations of the zoom lens 1 that has the above described structure will be discussed hereinafter. In the lens barrel accommodated state shown in FIG. 1, the zoom motor 30 is actuated to rotate in a lens barrel advancing direction upon a main switch (not shown) of the camera to which the zoom lens 1 is mounted being turned ON. The zoom gear 21 is driven to rotate by the zoom motor 30, and this rotation of the zoom gear 21 causes the helicoid ring 12 and the first advancing barrel 13 to move forward while rotating while being guided by the female helicoidal threads 11a of the lens barrel housing 11. The linear guide ring 14 linearly moves forward with the first advancing barrel 13 and the helicoid ring 12. At this time, the cam ring 17 which is given a rotational force from the first advancing barrel 13 moves forward in the optical axis direction by an amount of movement corresponding to the sum of the amount of the forward linear movement of the linear guide ring 14 and the amount of the forward movement of the cam ring 17 by a lead structure (composed of the set of three radially outer projections 17a of the cam ring 17 and the lead groove portions of the three guide slots 14b of the linear guide ring 14) provided between the cam ring 17 and the linear guide ring 14. Upon the helicoid ring 12 and the cam ring 17 being advanced to respective predetermined positions thereof, the functions of the rotating/advancing structures (helicoid and lead structures) of the helicoid ring 12 and the cam ring 17 are cancelled, so that the helicoid ring 12 and the cam ring 17 only rotate at respective axial fixed positions thereof in the optical axis direction.

A rotation of the cam ring 17 causes the second lens group moving frame 8, which is guided linearly via the second linear guide ring 18 inside the cam ring 17, to move in the optical axis direction in a predetermined moving manner due to the engagement of the cam followers 8b of the second lens group moving frame 8 with the second-lens-group control cam grooves 17b. In addition, the rotation of the cam ring 17 causes the third advancing barrel 19, which is guided linearly via the second advancing barrel 16 outside the cam ring 17, to move in the optical axis direction in a predetermined moving manner due to the relationship between the cam followers 19b with the first-lens-group control cam grooves 17c.

Namely, the amount of advancement of the first lens group LG1 from the lens barrel accommodated state is determined by the sum of the amount of forward movement of the cam ring 17 relative to the lens barrel housing 11 and the amount of advancement of the third advancing barrel 19 relative to the cam ring 17, and the amount of advancement of the second lens group LG2 from the lens barrel accommodated state is determined by the sum of the amount of forward movement of the cam ring 17 relative to the lens barrel housing 11 and the amount of advancement of the second lens group moving frame 8 relative to the cam ring 17. A zooming operation is carried out by moving the first lens group LG1 and the second lens group LG2 along the optical axis O while changing the air distance therebetween. When the zoom lens 1 is driven to advance from the lens barrel accommodate state shown in FIG. 1, the zoom lens 1 firstly moves into a lens barrel advanced state shown by an upper half of the zoom lens 1 in FIG. 2, in which the zoom lens 1 is set at the wide-angle extremity. Subsequently, the zoom lens 1 moves into a lens barrel advanced state shown by a lower half of the zoom lens 1 in FIG. 3, in which the zoom lens 1 is set at the telephoto extremity, by a further rotation of the zoom motor 30 in a lens barrel advancing direction thereof. In the zoom range between the wide-angle extremity and the telephoto extremity, the helicoid ring 12, the first advancing barrel 13 and the cam ring 17 rotate at their respective axial fixed positions, i.e., without moving in the optical axis direction. Upon the aforementioned main switch of the camera being turned OFF, the zoom motor 30 is driven to rotate in the lens barrel retracting direction, so that the zoom lens 1 operates in the reverse manner to the above described advancing operations to thereby return to the accommodated state shown in FIG. 1.

When the zoom lens 1 is in the ready-to-photograph state between the wide-angle extremity and the telephoto extremity, the third lens group frame 7 that supports the third lens group LG3 moves along the optical axis O to perform a focusing operation by driving the AF motor 31 in accordance with object distance information obtained via a distance measuring device (not shown).

The overall operation of the zoom lens 1 has been discussed above. Operations of the retracting structure of the zoom lens 1 which are mainly related to the operations of the second lens group LG2 and the shutter unit SB will be discussed hereinafter. In FIGS. 17 through 21, a plurality of elements of the zoom lens 1 which are not supposed to appear in a single cross section are shown in a single drawing for the purpose of illustration. More specifically, in addition to a cross section taken at a position passing through the optical axis O, a cross section taken in the vicinity the shutter guide shaft 36, the relative position between the second-lens-group-displacing control projection 23a and the position control projection 6g of the second lens group frame 6 and the relative position between the rotation limit surface 9p of the shutter support ring 9 and the rotation limit projection 6i of the second lens group frame 6 are simultaneously shown in each of FIGS. 17 through 21. In FIGS. 17 through 21, a two-dot chain line Q1 represents the position of the front surface of the radially inner flange 8c of the second lens group moving frame 8 in the optical axis direction, a two-dot chain line Q2 represents the position of the front surface of the front flange portion 9a of the shutter support ring 9 in the optical axis direction, and a two-dot chain line Q3 represents a reference surface on the CCD support plate 23. The reference surface Q3 is a fixed surface position which does not move by either a zooming operation or a focusing operation of the zoom lens 1.

Figure 10:
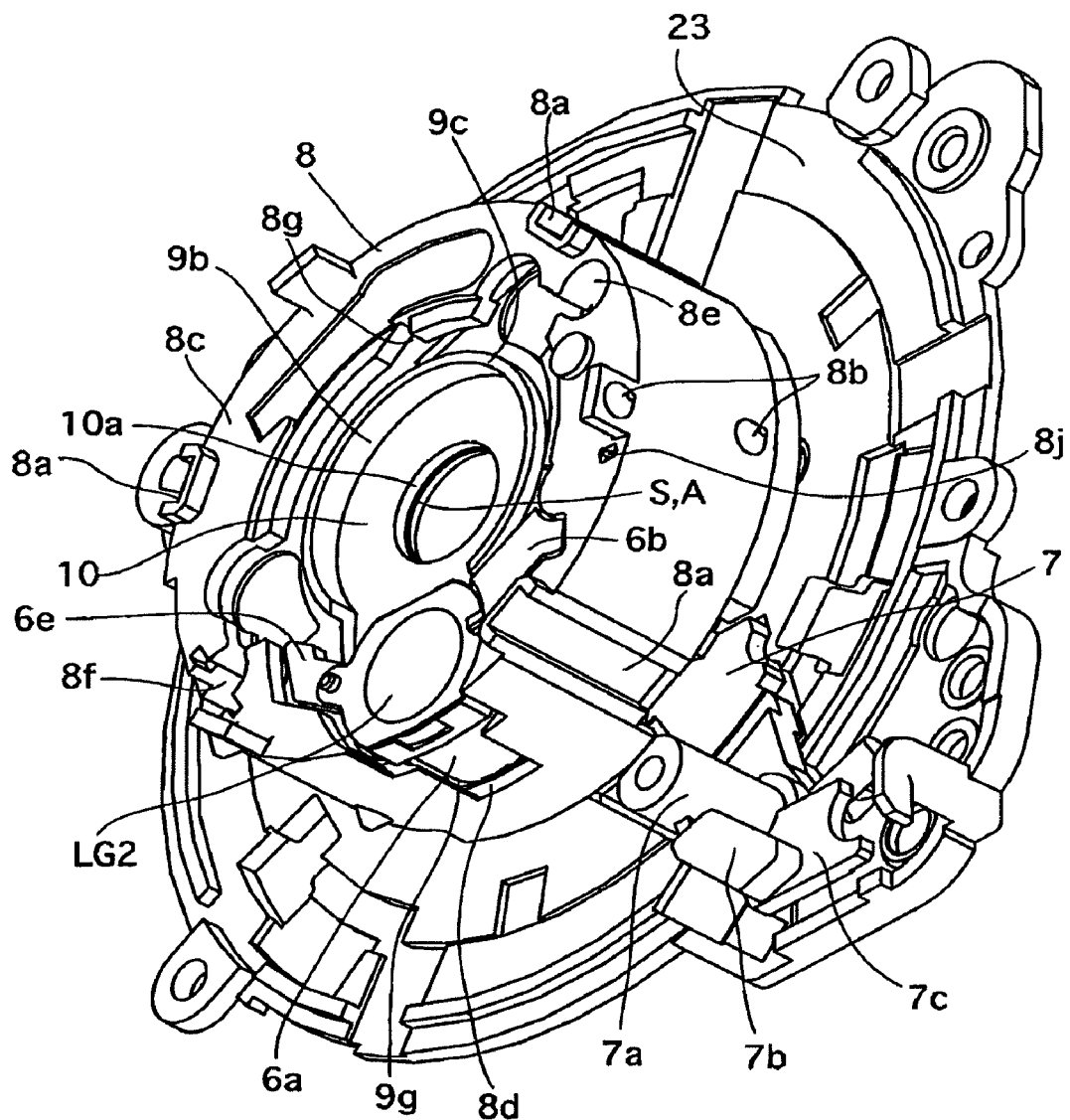
FIG. 10 is a perspective view of a second lens group moving frame, a CCD support plate and other associated elements of the zoom lens in the accommodated state thereof.
Figure 11:
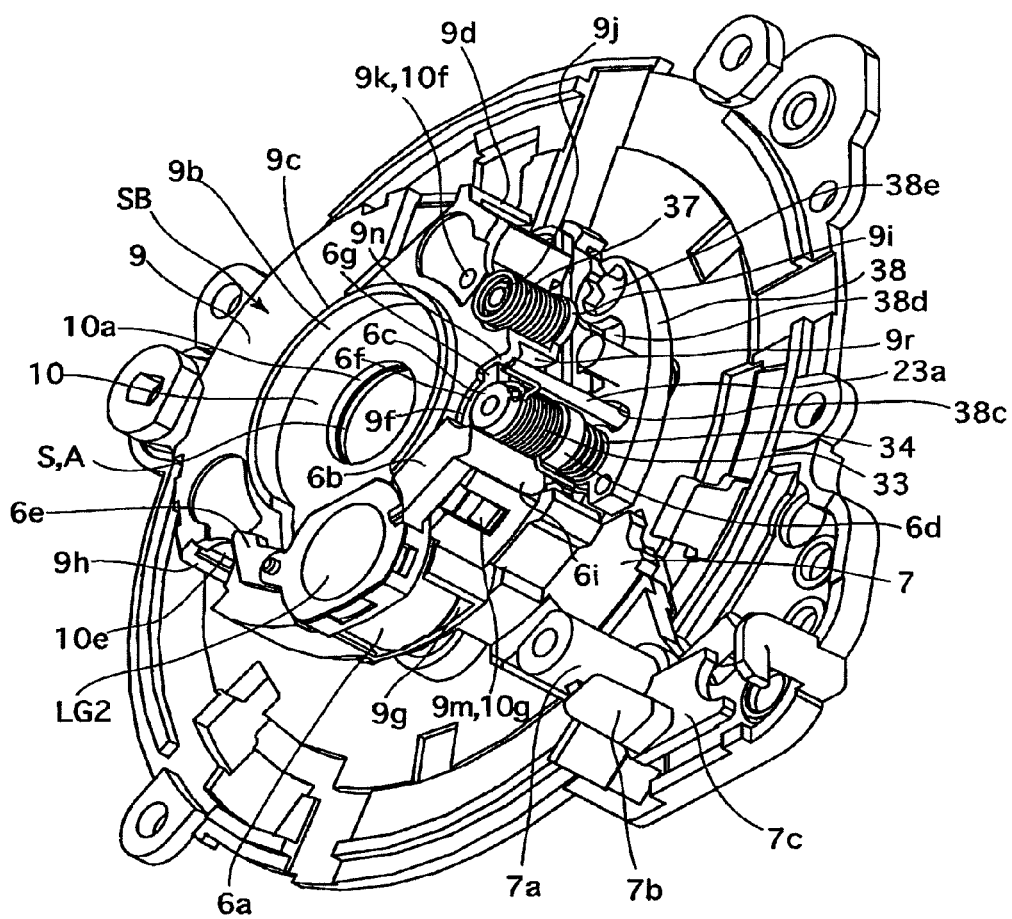
FIG. 11 is a perspective view of the elements shown in FIG. 10 from which the second lens group moving frame is removed for clarity.
Figure 12:
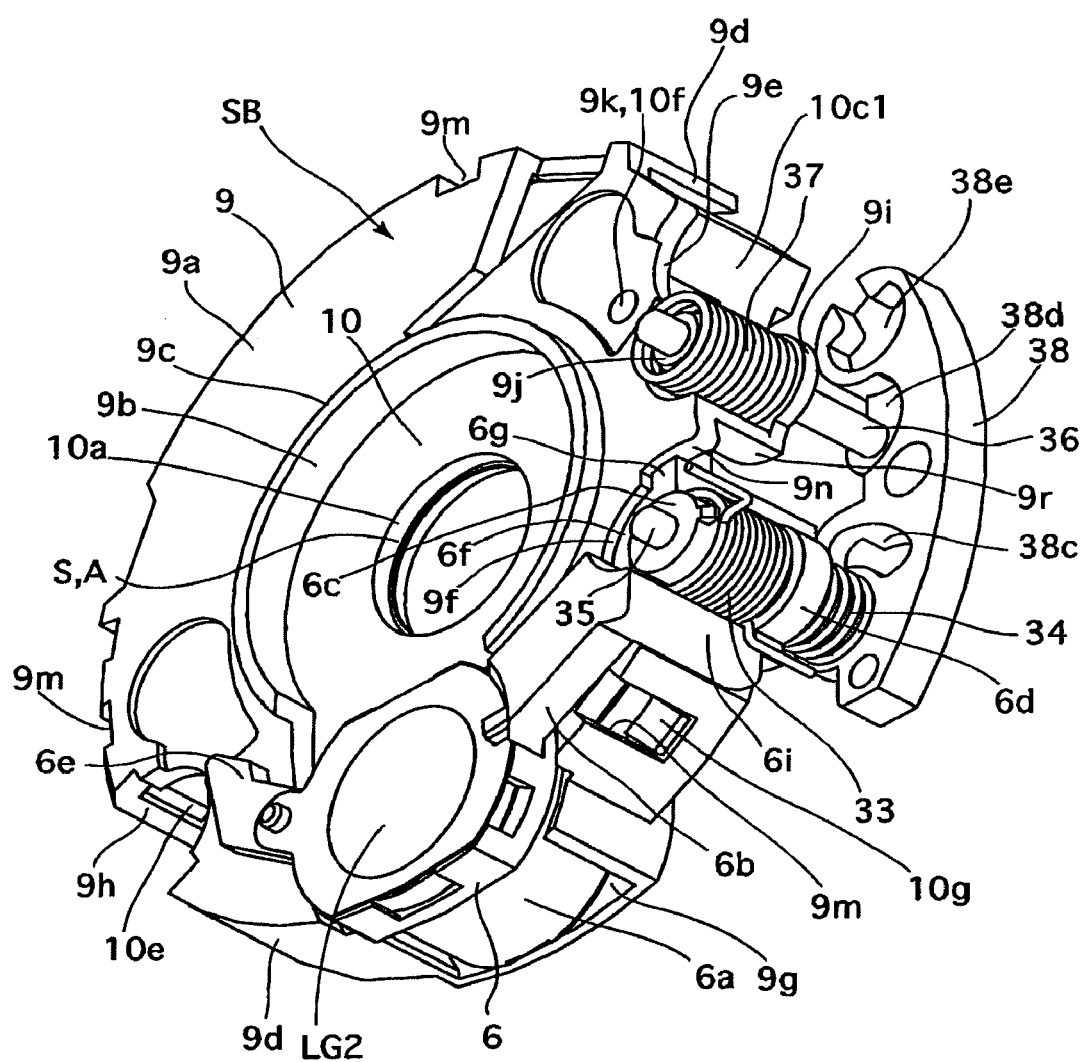
FIG. 12 is a perspective view of the elements positioned in the second lens group moving frame, from which the second lens group moving frame is removed for clarity, in the accommodated state of the zoom lens.
Figure 13:
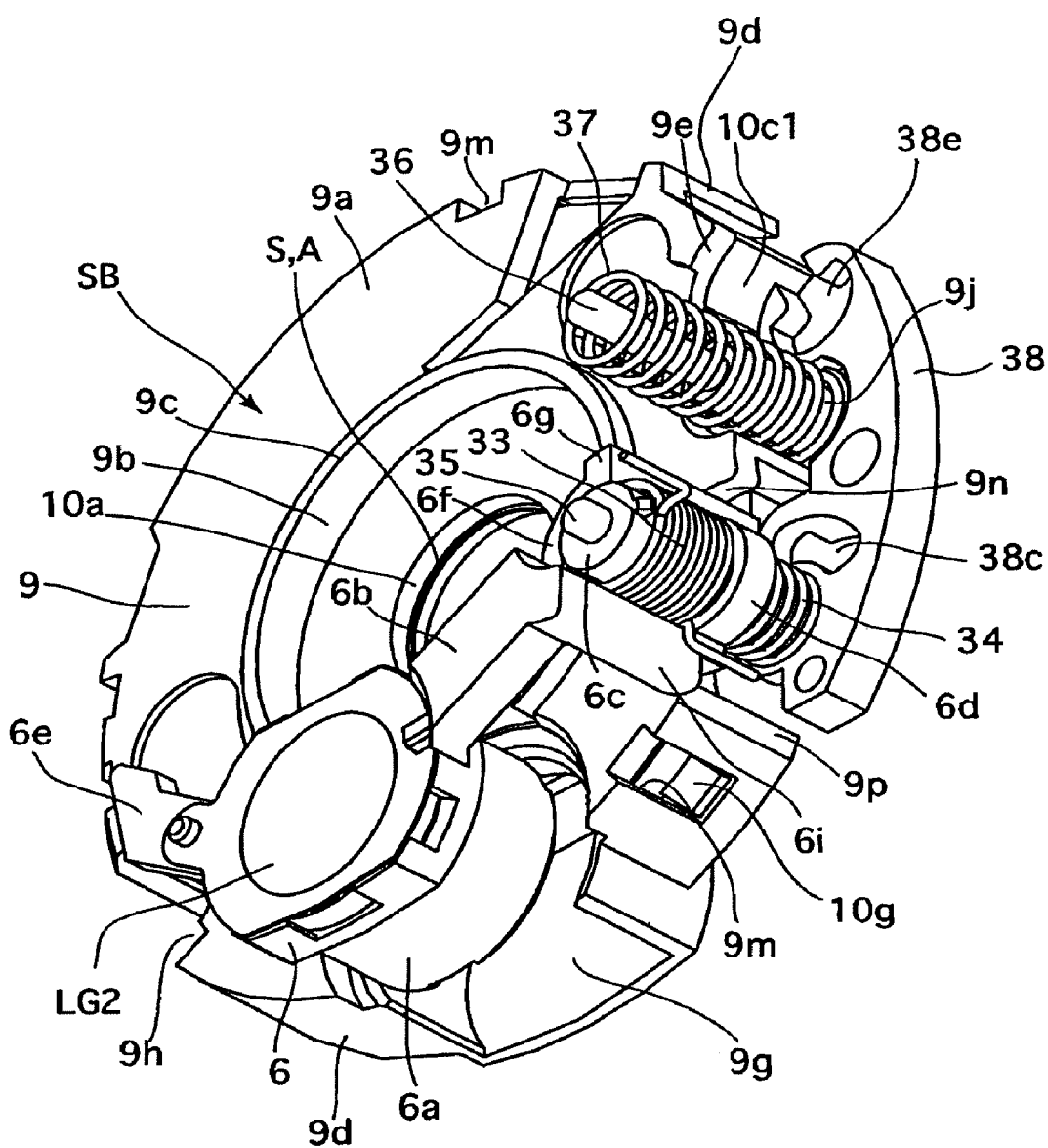
FIG. 13 is a view similar to that of FIG. 12, showing a state where the cylindrical lens holding portion of the second lens group frame held in an off-axis displaced position is positioned forwardly out of a second lens group accommodating recess formed on a shutter unit of the zoom lens.
Figure 17:
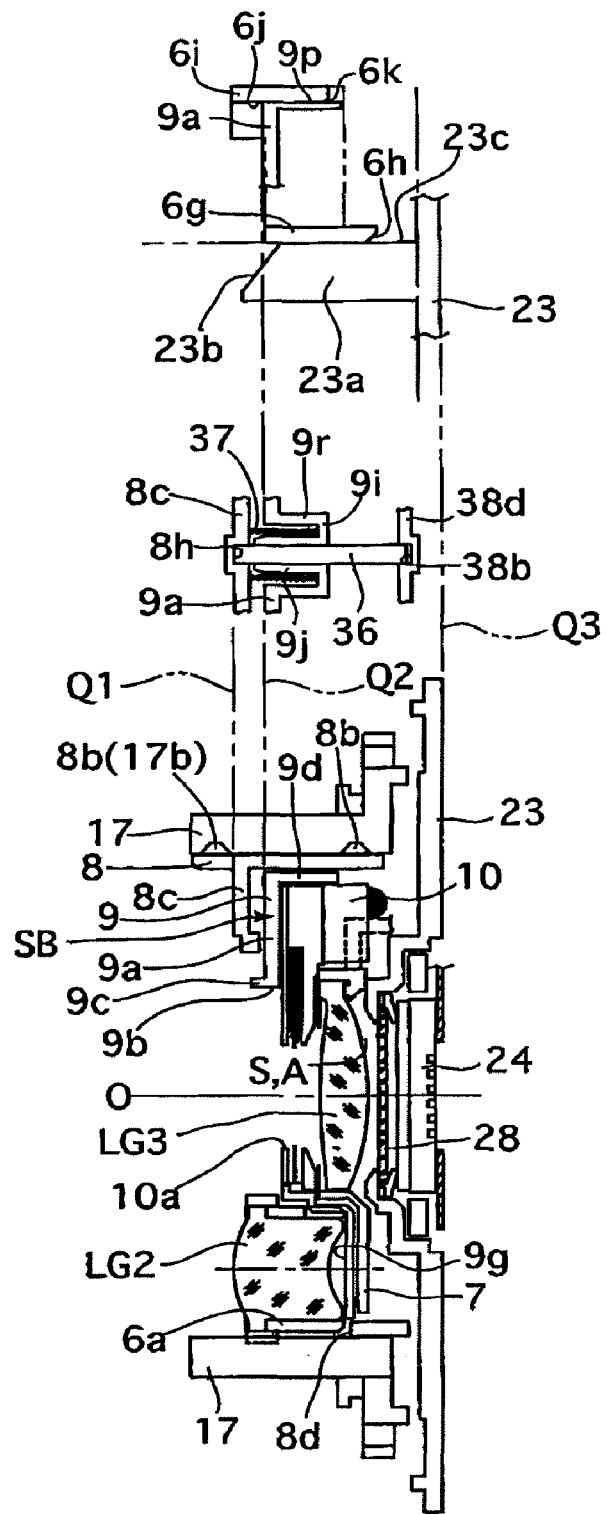
FIG. 17 is a cross sectional view, partly omitted for clarity, of optical elements from the second lens group to a CCD image sensor and driven members for the second lens group and the shutter unit in the accommodated state of the zoom lens, showing the positional relationship among these optical elements and the driven members in the optical axis direction with being vertically lined up.

The state shown in FIG. 17 corresponds to the lens barrel accommodated state of the zoom lens 1. In FIG. 17, the third lens group frame 7 has been retracted to the rear movement limit, in which the third lens group frame 7 comes in contact with the front of the CCD support plate 23. In this state, a rear surface of the shutter sub-unit 10, which is an element of the shutter unit SB, is in contact with the front of the third lens group frame 7, so that the shutter unit SB is prevented from further retracting. The second lens group moving frame 8 is further retracted against the biasing force of the shutter unit press spring 37 relative to the shutter unit SB which is prevented from retracting to thereby make the radially inner flange 8c (Q1) positioned closely to the front flange portion 9a (Q2) of the shutter support ring 9 while compressing the shutter unit press spring 37. At this time, as shown in FIGS. 15 and 17, the second lens group frame 6 is held at the off-axis displaced position, in which the second lens group LG2 is displaced downward from the optical axis O, due to the engagement of the side surface 6m of the position control projection 6g with the side surface 23c of the second-lens-group-displacing control projection 23a, and the cylindrical lens holder 6a that holds the second lens group LG2 is accommodated in the second lens group accommodation recess 9g of the shutter support ring 9 as shown in FIGS. 10, 11 and 12.

Although the second lens group frame 6 is biased to rotate clockwise with respect to FIG. 15 by the second-lens-group-frame returning spring 33, the second lens group frame 6 is prevented from rotating in this clockwise biasing direction by the engagement of the position control projection 6g with the side surface 23c of the second-lens-group-displacing control projection 23a. Simultaneously, the rotation limit surface 6j of the rotation limit projection 6i faces the rotation limit surface 9p of the shutter support ring 9 in the rotation direction of the second lens group frame 6, and the second lens group frame 6 is prevented from rotating in the clockwise direction with respect to FIG. 15 due also to the engagement between the rotation limit surface 9p and the rotation limit surface 6j. Namely, aside from the second-lens-group-displacing control projection 23a that is used to control the position of the second lens group frame 6, the zoom lens 1 is provided also between the shutter unit SB and the second lens group frame 6 with a displaced position holding device, configured by the rotation limit projection 6i, the rotation limit surface 6j and the rotation limit surface 9p, for independently holding the second lens group frame 6 to the off-axis displaced position.

In the lens barrel accommodated state of the zoom lens 1 shown in FIG. 17, the shutter S and the adjustable diaphragm A are positioned closely to the third lens group LG3, while the shutter unit SB and the third lens group LG3 are positioned in an axial range substantially identical to an axial range in the optical axis direction in which the second lens group LG2 is positioned (the second lens group LG2 is positioned so as to coincide with the shutter unit SB and the third lens group LG3 in a direction orthogonal to the optical axis O), which makes it possible to achieve a substantial reduction in thickness of the accommodation space for the optical elements from the second lens group LG2 to the third lens group LG3 (with the shutter S and the adjustable diaphragm A being positioned between the second lens group LG2 and the third lens group LG3) in the optical axis direction, thus achieving a reduction in length of the zoom lens 1 in the accommodated state thereof. In addition, as shown in FIG. 1, in the accommodated state of the zoom lens 1, the first lens group frame 4 has been retracted until a rear surface thereof comes in contact with the front-end annular rib 9c of the shutter support ring 9, so that the space between the first lens group LG1 and the shutter unit SB is also reduced. Additionally, a rear portion of the first lens group LG1 and a front portion of the second lens group LG2 are also positioned in the same axial range in the optical axis direction (so as to overlap each other in the optical axis direction). Accordingly, in the zoom lens 1, the entire optical system that ranges from the first lens group LG1 (closest to the object side) to the CCD image sensor 24 (on which an object image is formed) is retracted and accommodated in an extremely compact fashion within a minimum size (length) in the optical axis direction.

FIGS. 18 through 21 show transitional states of the zoom lens 1 subsequent to the accommodated state shown in FIG. 17 to the wide-angle extremity state in time order. When the zoom lens 1 is advanced from the accommodated state shown in FIG. 1 by an operation of the zoom motor 30, the second lens group moving frame 8 advances in the optical axis direction. Thereupon, since there is room for the second lens group moving frame 8 to move forward relative to the shutter unit SB, the second lens group moving frame 8 moves forward; however, the shutter unit SB continues to be pressed against the front of the third lens group frame 7 by the biasing force of the shutter unit press spring 37, thus not moving in the optical axis direction. As a result, the distance between the positions Q2 and Q3 does not vary and the distance between the positions Q1 and Q2 increases. The second lens group frame 6 and the retaining plate 38 also move forward integrally with the second lens group moving frame 8, and this forward movement causes the cylindrical lens holder 6a of the second lens group frame 6 to move forward out of the second lens group accommodation recess 9g, and further causes the movement limit recessed portion 38d of the retaining plate 38 to approach the movement limit plate 9i of the shutter support ring 9.

Figure 18:
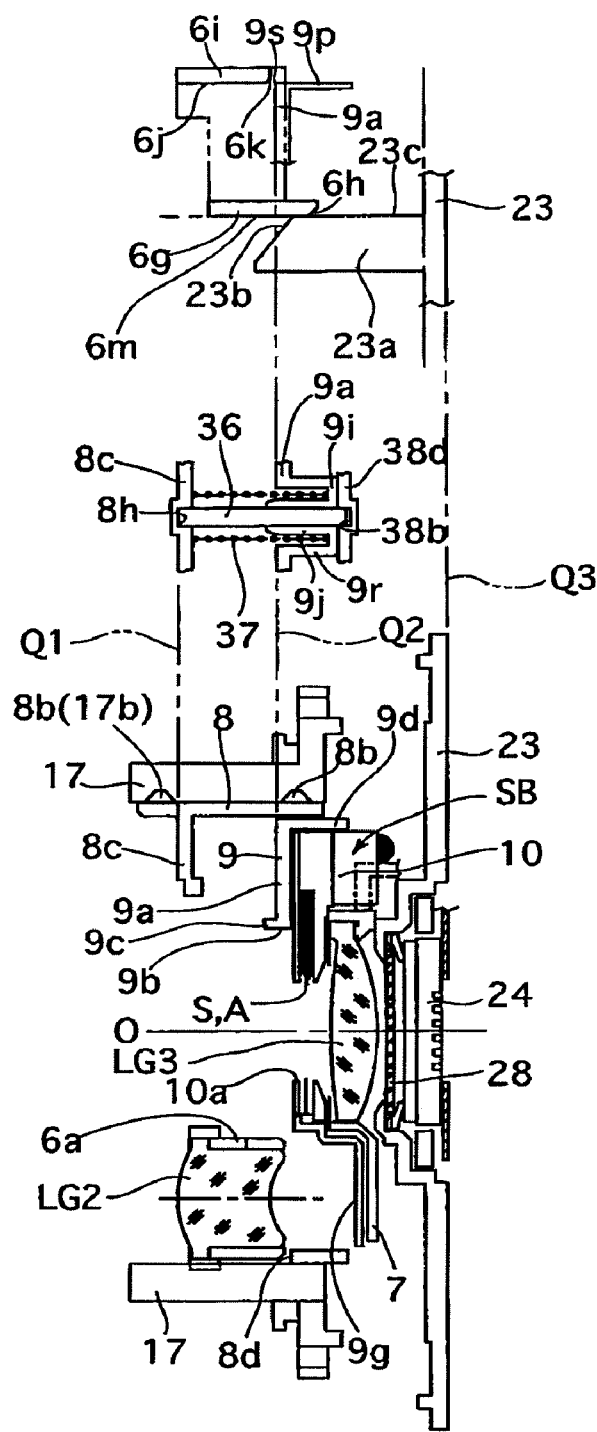
FIG. 18 is a view corresponding to that of FIG. 17, showing a state where the cylindrical lens holding portion of the second lens group frame has moved forward out of the second lens group accommodating recess of the shutter unit due to a forward movement of the second lens group moving frame from the accommodated state shown in FIG. 17.

The distance between the positions Q1 and Q2 continues to increase until the zoom lens 1 comes into the state shown in FIG. 18. FIG. 18 shows a state where the movement limit recessed portion 38d of the retaining plate 38 abuts against the movement limit plate 9i of the shutter support ring 9 as a result of the forward movement of the second lens group moving frame 8. Upon the second lens group moving frame 8 being moved forward to the position shown in FIG. 18, the cylindrical lens holder 6a of the second lens group frame 6 is disengaged forwardly from the second lens group accommodation recess 9g of the shutter support ring 9 (see FIG. 13). In addition, the rear end of the rotation limit projection 6i slightly projects forward from the front end of the rotation limit surface 9p (see FIG. 22) so that the prevention of rotation of the second lens group frame 6 toward the photographing position by the engagement between the rotation limit surface 9p and the rotation limit surface 6j is released.

During the transitional state from the state shown in FIG. 17 to the state shown in FIG. 18, the side surface 6m of the position control projection 6g remains in contact with the side surface 23c of the second-lens-group-displacing control projection 23a, and the second lens group frame 6 is held at the off-axis displaced position by the second-lens-group-displacing control projection 23a, independently of the prevention of rotation by the rotation limit surface 9p. However, if the prevention of rotation of the second lens group frame 6 by the engagement of the side surface 23c of the second-lens-group-displacing control projection 23a with the side surface 6m of the position control projection 6g is released due to some kind of mechanical error before the zoom lens 1 comes into the state shown in FIG. 18, the second lens group frame 6 is prevented from rotating toward the photographing position by the engagement of the rotation limit surface 6j of the rotation limit projection 6i with the rotation limit surface 9p of the shutter support ring 9. Both the second lens group accommodation recess 9g and the rotation limit surface 9p are formed on the shutter support ring 9 so that there is no room for any mechanical error therebetween. Accordingly, if at least part of the cylindrical lens holder 6a of the second lens group frame 6 is positioned in the second lens group accommodation recess 9g, the second lens group frame 6 can be securely prevented from rotating toward the photographing position by the engagement between the rotation limit surface 6j and the rotation limit surface 9p. Namely, the second lens group frame 6 and the shutter support ring 9 have a fail-safe structure for holding the second lens group frame 6 in the off-axis displaced position against the biasing force of the second-lens-group-frame returning spring 33 by the rotation limit projection 6i and the rotation limit surface 9p during the time the second lens group frame 6 and the shutter support ring 9 are positioned relative to each other so that mutual interference would otherwise occur between the cylindrical lens holder 6a and the second lens group accommodation recess 9g if the second lens frame 6 were to rotate toward the photographing position (optical axis O).

Figure 19:
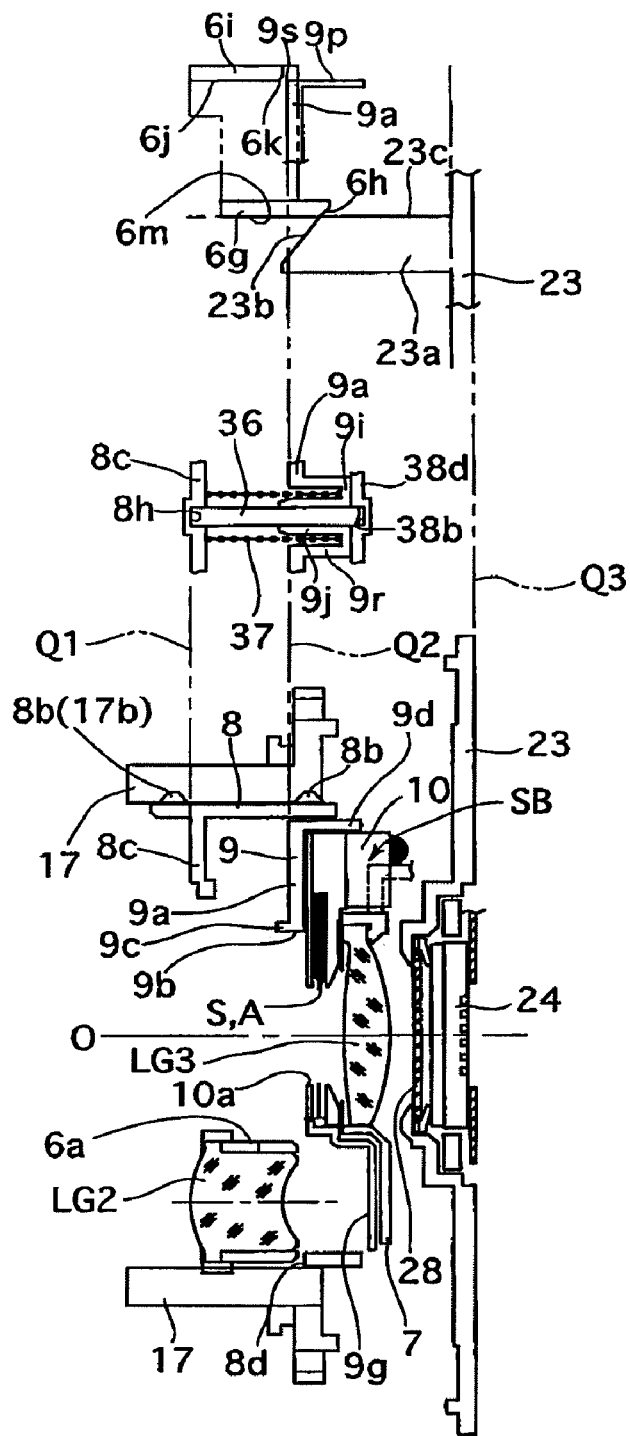
FIG. 19 is a view corresponding to that of FIG. 17, showing a state where the second lens group frame has moved to the rotation commencement position thereof, in which the second lens group frame commences to rotate from the off-axis displaced position to the photographing position, due to a forward movement of the second lens group moving frame from the state shown in FIG. 18.

Upon the movement limit plate 9i and the movement limit recessed portion 38d being engaged with each other as shown in FIG. 18, the movement limit recessed portion 38d presses the movement limit plate 9i to integrally move the second lens group moving frame 8 and the shutter unit SB forward in the optical axis direction. Namely, the distance between the positions Q1 and Q3 and the distance between the positions Q2 and Q3 equally increase while the distance between the distance Q1 and Q2 is maintained constant. FIG. 19 shows a state where the boundary between the rear-end inclined surface 6h and a side surface 6m of the position control projection 6g has reached the boundary between the inclined displacing surface 23b and the side surface 23c of the second-lens-group-displacing control projection 23a as a result of an increase of the distance between the positions Q1 and Q3. In this state shown in FIG. 19, the prevention of rotation of the second lens group frame 6 by the engagement of the side surface 23c with the side surface 6m of the position control projection 6g is released, and a forward movement of the second lens group moving frame 8 from the position shown in FIG. 19 causes the second lens group frame 6 to rotate from the off-axis displaced position toward the photographing position (on-axis position) by the biasing force of the second-lens-group-frame returning spring 33 while making the rear-end inclined surface 6h of the position control projection 6g slide on the inclined displacing surface 23b of the second-lens-group-displacing control projection 23a. Since the cylindrical lens holder 6a of the second lens group frame 6 is already disengaged forwardly from the second lens group accommodation recess 9g at the stage (point in time) shown in FIG. 18 as noted above, the second lens group frame 6 does not interfere with the shutter support ring 9, thus not being prevented from rotating by the shutter support ring 9.

Figure 14:
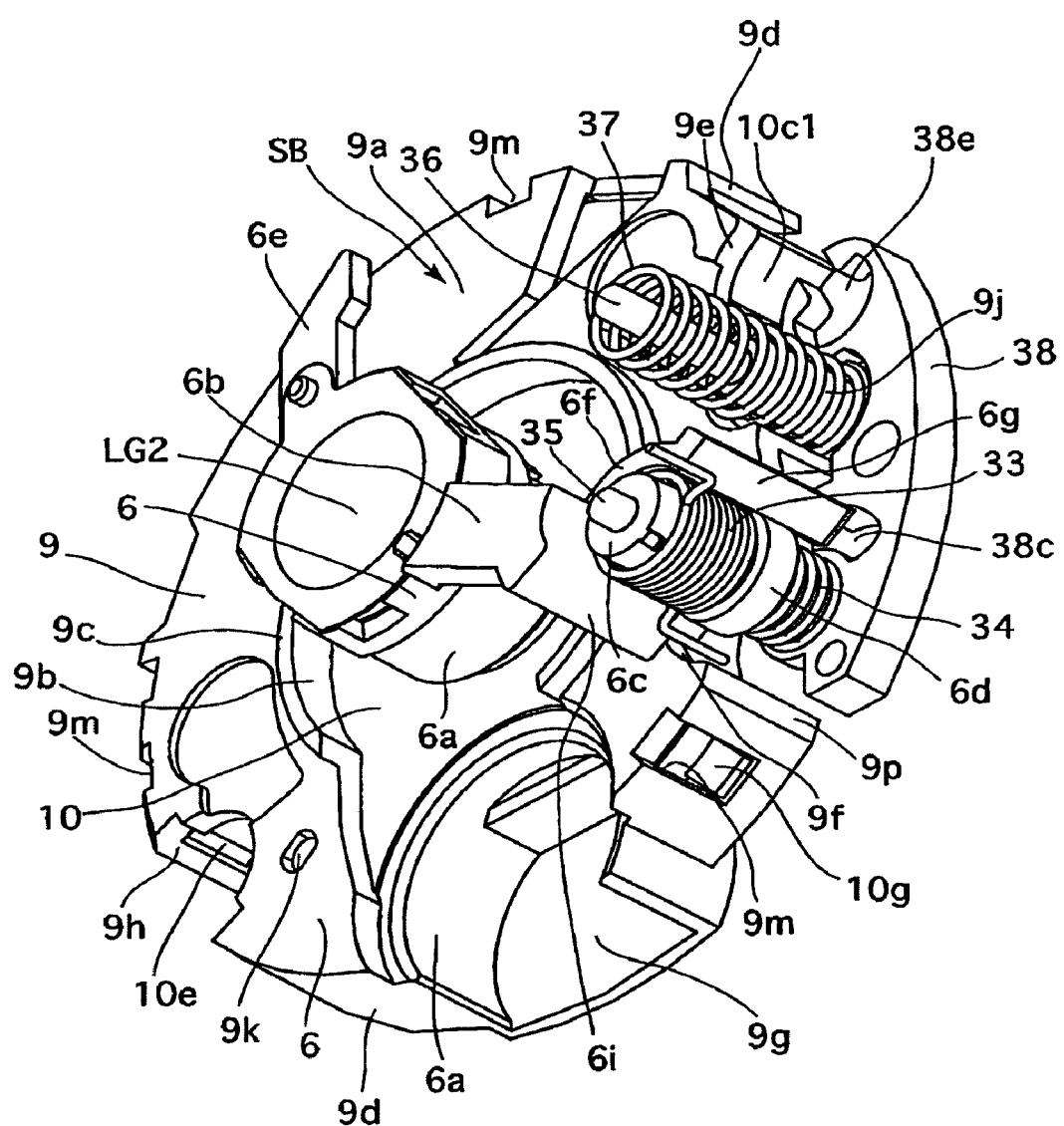
FIG. 14 is a view similar to that of FIG. 12, showing the positional relationship between the second lens group frame held in the photographing position thereof and the shutter unit.
Figure 20:
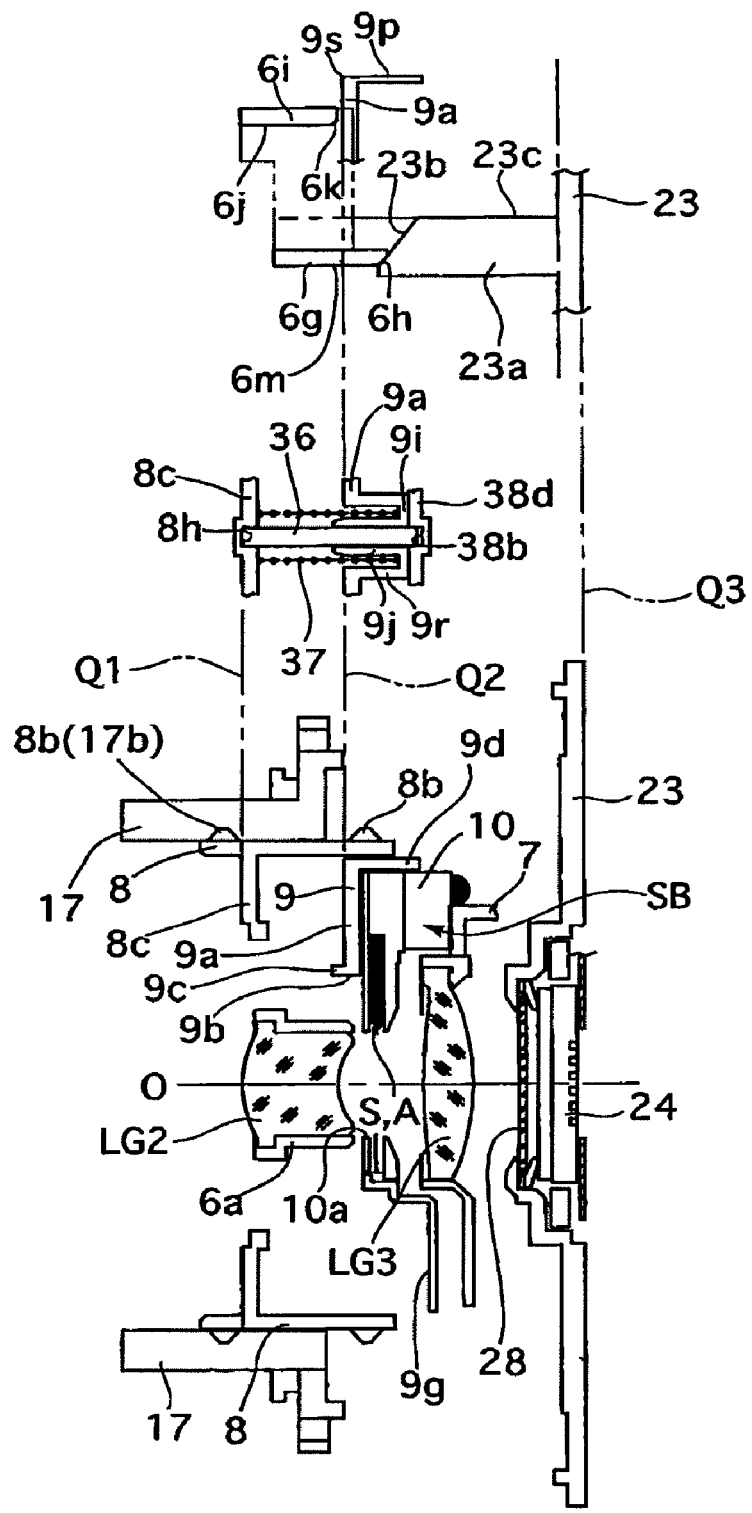
FIG. 20 is a view corresponding to that of FIG. 17, showing a state where the second lens group frame has moved to the photographing position thereof due to a forward movement of the second lens group moving frame from the state shown in FIG. 19.

FIGS. 14 and 20 show a state where the second lens group frame 6 has rotated to the photographing position. In this state, the second lens group LG2 having been moved onto the optical axis O is positioned in front of the shutter unit SB, and thereafter the distance between the second lens group LG2 and a combination of the shutter S and the adjustable diaphragm A in the optical axis direction is maintained constant until the lens barrel retracting operation is again performed. During the time from the state shown in FIG. 19 to the state shown in FIG. 20, in which the second lens group frame 6 is rotated to the photographing position, the forward movement of the second lens group moving frame 8 and the shutter unit SB still continues, so that each of the distance between the positions Q1 and Q3 and the distance between the positions Q2 and Q3 increases while the distance between the distance Q1 and Q2 is maintained constant.

In the accommodated state shown in FIG. 17, the shutter unit SB (specifically a rear surface of the shutter sub-unit 10) presses the third lens group frame 7 up to the mechanical rear movement limit thereof where the third lens group frame 7 comes in contact with the CCD support plate 23 against the biasing force of the third lens group biasing spring 39. At this stage, the AF nut 31b is stopped at a stop position forwardly away from the movement control plate 7c of the third lens group frame 7, and this stop position of the AF nut 31b corresponds to the practical (controlled-by-software) rear movement limit of the third lens group frame 7 which is used in the ready-to-photograph state. When the shutter unit SB is moved forward afterwards, as shown in FIG. 18, by a lens barrel advancing operation of the zoom lens 1 from the accommodated state, the third lens group frame 7 also moves forward by the biasing force of the third lens group biasing spring 39 following the forward movement of the shutter unit SB. Thereafter, at some point during the time from the commencement of the rotation of the second lens group frame 6 toward the photographing position (shown in FIG. 19) to the completion of this rotation to the photographing position (shown in FIG. 20), the movement control plate 7c comes into contact with the AF nut 31b to prevent the third lens group frame 7 from moving forward. Thereafter, the second lens group LG2 and the shutter unit SB continue to move forward away from the third lens group LG3.

Figure 21:
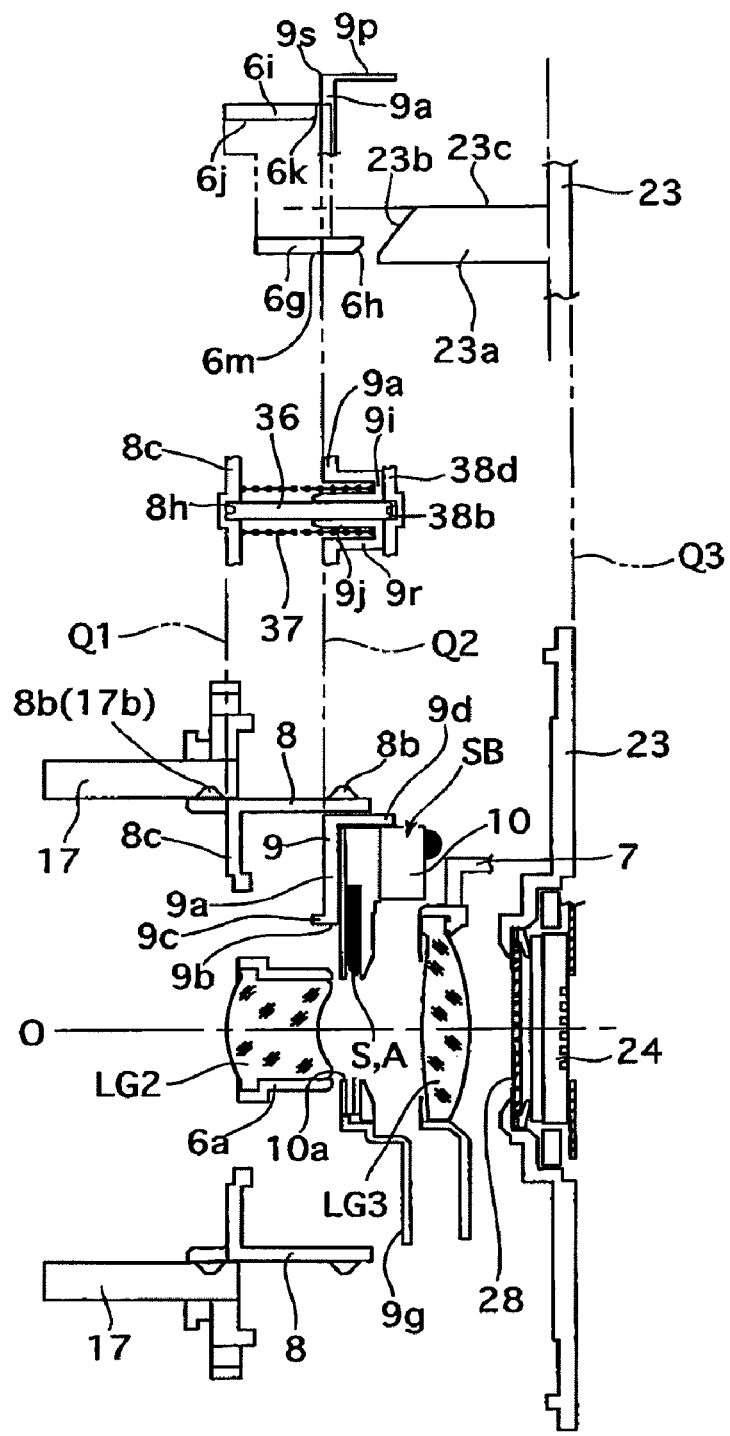
FIG. 21 is a view corresponding to that of FIG. 17, showing a state of the zoom lens set at the wide-angle extremity where the second lens group moving frame has further moved forward from the state shown in FIG. 20.

Upon the second lens group frame 8 being advanced to the position shown in FIG. 21, the zoom lens 1 comes into the ready-to-photograph state at the wide-angle extremity. In this state, the position control projection 6g of the second lens group frame 6 is disengaged forwardly from the second-lens-group-displacing control projection 23a, while the rear-end inclined surface 6h and the inclined displacing surface 23b are spaced apart from each other and face each other in the optical axis direction. Thereafter, until the lens barrel retracting operation is again performed, the second lens group frame 6 is held in the photographing position without the rear-end inclined surface 6h and the inclined displacing surface 23b coming in contact with each other. In addition, in the state where the zoom lens 1 is set at the wide-angle extremity, the distance between the shutter unit SB and the third lens group LG3 is greater than that in the state shown in FIG. 20. In the zoom range from the wide-angle extremity to the telephoto extremity, the second lens group moving frame 8 is not moved further rearward from the position shown in FIG. 21, and a focusing operation can be performed by moving the third lens group frame 7 forward from the position shown in FIG. 21 by driving the AF motor 31.

In the lens barrel retracting operation of the zoom lens 1 from the wide-angle extremity state, operations (movements) reverse to the above described operations are performed. The details of duplicate descriptions of the lens barrel retracting operation are omitted from the following description. Firstly the third lens group frame 7 is positioned at the rear movement limit thereof by the AF motor 31 as shown in FIG. 21 under control by software. Subsequently, the second lens group moving frame 8 is moved rearward in the optical axis direction by a rotation of the zoom motor 30 in the lens barrel retracting direction. Thereafter, the rear-end inclined surface 6h of the position control projection 6g which moves rearward with the second lens group moving frame 8 comes into contact with the inclined displacing surface 23b of the second-lens-group-displacing control projection 23a as shown in FIG. 20. Further rearward movement of the second lens group moving frame 8 causes the second lens group frame 6 to rotate from the photographing position to the off-axis displaced position shown in FIG. 19 due to the engagement between the rear-end inclined surface 6h and the inclined displacing surface 23b. Additionally, during the course of the rotation of the second lens group frame 6 to the off-axis displaced position, the rear end of the shutter unit SB, in the process of moving rearward with the second lens group frame 8 in the optical axis direction, comes into contact with (abuts against) the front of the third lens group frame 7, and presses the third lens group frame 7 rearward against the biasing force of the third lens group biasing spring 39 to bring the third lens group frame 7 closer to the CCD support plate 23 than the rear movement limit thereof controlled by software.

The second lens group moving frame 8 continues to move rearward even after the second lens group frame 6 completes the rotation thereof to the off-axis displaced position, while pressing the third lens group frame 7 rearward via the shutter unit SB. In due course, a rear surface of the third lens group frame 7 comes into contact with a front surface of the CCD support plate 23 to thereby prevent the third lens group frame 7 and the shutter unit SB from moving rearward.

Upon this prevention of rearward movement of the shutter unit SB taking place, the second lens group moving frame 8 and the second lens group frame 6 continue to move rearward. Thereupon, the second lens group moving frame 8 and the second lens group frame 6 move rearward against the biasing force of the shutter unit press spring 37 relative to the shutter unit SB which is at a standstill (stopped) so as to reduce the distance between the front flange portion 9a of the shutter support, ring 9 and the radially inner flange 8c of the second lens group moving frame 8. As a result, the cylindrical lens holder 6a of the second lens group frame 6 enters the second lens group accommodation recess 9g of the shutter support ring 9 as shown in FIG. 17. Due to this relative movement in the optical axis direction, the rotation limit surface 6j of the rotation limit projection 6i of the second lens group frame 6 is moved to a position to face the rotation limit surface 9p of the shutter support ring 9, so that the second lens group frame 6 is prevented from rotating toward the photographing position also by the engagement between the rotation limit surface 6j and the rotation limit surface 9p, independently of the engagement between the second-lens-group-displacing control projection 23a of the CCD support plate 23 and the position control projection 6g of the second lens group frame 6.

Figure 22:
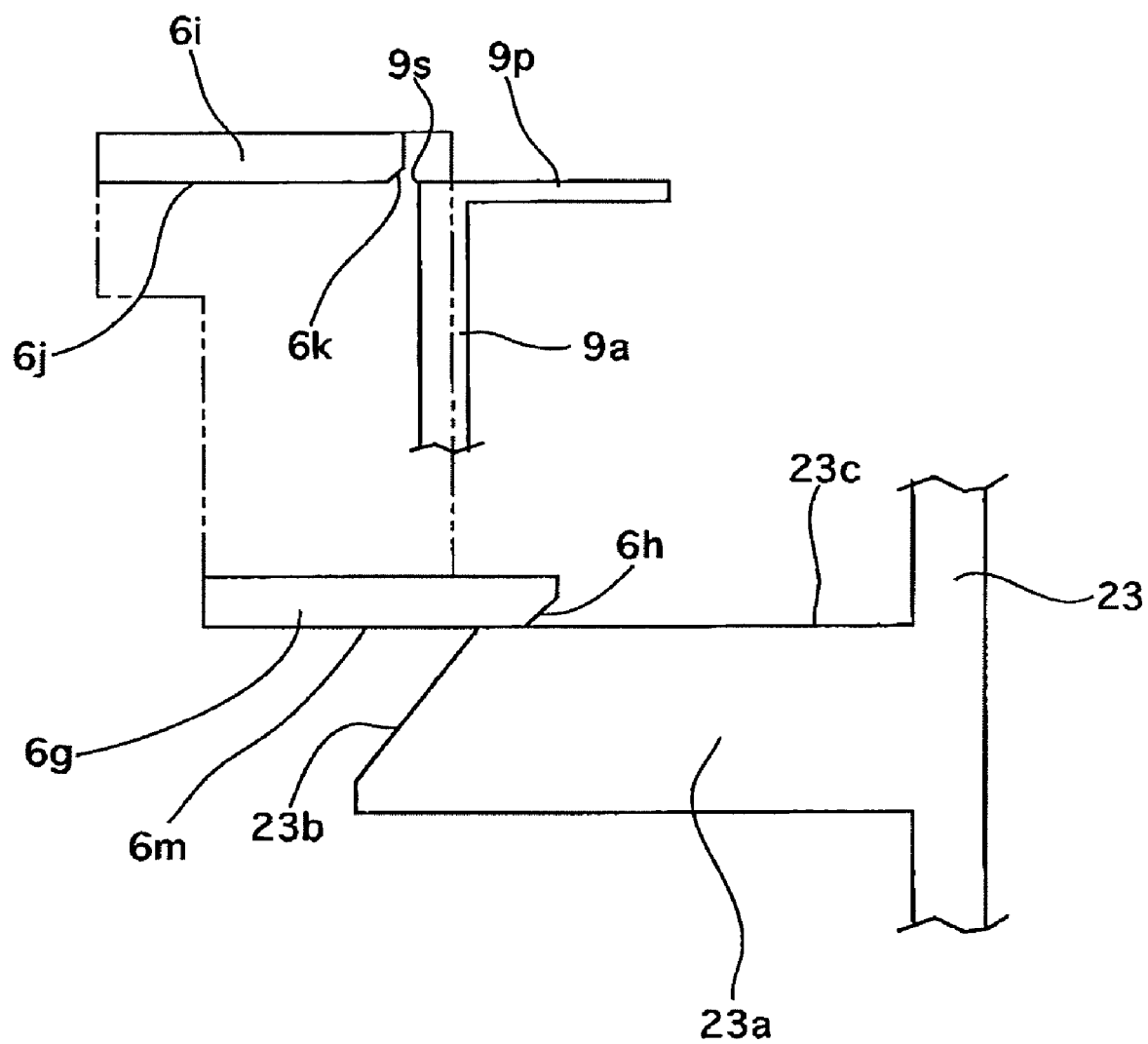
FIG. 22 is an enlarged view of a portion of the second lens group frame and a portion of the CCD support frame, showing the positional relation among the position-control projection and the rotation limit projection of the second lens group frame, the second lens group displacing projection of the CCD support plate, and the rotation limit surface of the shutter support ring in the state shown in FIG. 18.

As shown in FIG. 22 that shows an enlarged view of a portion of the second lens group frame 6 and a portion of the CCD support frame 23 in the state shown in FIG. 18, the inclined surface portion 6k that is formed on the rear end of the rotation limit projection 6i is positioned in front of a boundary corner (displacing-operation assist portion) 9s between the front flange portion 9a and the rotation limit surface 9p of the shutter support ring 9 at a stage immediately before the rotation limit surface 6j and the rotation limit surface 9p come into contact with each other in the lens barrel retracting operation of the zoom lens 1 (at a stage at which the second lens group frame 6 has been rotated to the off-axis displaced position by the second-lens-group-displacing control projection 23a). From this state, an approach of the second lens group frame 6 toward the shutter support ring 9 causes the inclined surface portion 6k to come into contact with the boundary corner 9s, and a component force which makes the second lens group frame 6 further rotate toward the off-axis displaced position is produced due to the inclined shape of the inclined surface portion 6k. Consequently, the second lens group frame 6 is slightly displaced toward the off-axis displaced position, which causes the rotation limit surface 6j to come into contact with the rotation limit surface 9p across the boundary corner 9s. In this manner, the second lens group frame 6 and the shutter support ring 9 are provided therebetween with contacting portions (displacing-operation assist portions, i.e., the inclined surface 6k and the boundary corner 9s) which are configured to impart a component force on the second lens group frame 6 in a direction to move the second lens group frame 6 toward the off-axis displaced position upon receiving a relative movement between the second lens group frame 6 and the shutter support ring 9 in the optical axis direction, and accordingly, a malfunction (causing the second lens group frame 6 to become incapable of moving rearward) which may be caused by a collision between the second lens group frame 6 and the shutter support ring 9 can be prevented from occurring during the lens barrel retracting operation of the zoom lens 1. Note that a portion corresponding to the inclined surface portion 6k can be formed on the shutter support ring 9 instead.

Additionally, when the second lens group moving frame 8 and the second lens group frame 6 move rearward relative to the shutter unit SB which is at a standstill (stopped), the distance between the radially inner flange 8c of the second lens group moving frame 8 and the movement limit plate 9i of the shutter support ring is reduced to thereby compress the shutter unit press spring 37. At this time, the outer peripheral surface of the advancing/retracting support cylinder 9j and the inner peripheral surface of the semi-cylindrical connecting wall 9r that are concentrically arranged prevent the shutter unit press spring 37 from buckling.

Upon completion of the lens barrel retracting operation of the zoom lens 1 to the lens barrel accommodated position shown in FIG. 17, the first lens group frame 4 is retracted until it comes into contact with the front-end annular rib 9c of the shutter support ring 9 as shown in FIG. 1, so that the distance between the first lens group LG1 and the shutter unit SB is also further reduced. Thereupon, the zoom lens 1 comes into the accommodated state (i.e., retracts to the fully-retracted state), in which the distance from the first lens group LG1 to the reference surface Q3 on the CCD support plate 23 in the optical axis direction is extremely minimized.

As described above, in the zoom lens 1, the second lens group LG2 and the shutter unit SB, which are arranged with a predetermined fixed distance therebetween in the optical axis direction in the ready-to-photograph state (in the zoom range), are accommodated in the second lens group moving frame 8 in a manner such that an axial range in the optical axis direction in which the second lens group LG2 is positioned and an axial range in the optical axis direction in which the shutter unit SB is positioned become substantially the same (the second lens group LG2 and the shutter unit SB are positioned so as to coincide in a direction orthogonal to the optical axis O). Therefore, the space occupied by the second lens group LG2 and the shutter unit SB in the optical axis direction when the zoom lens 1 is in the accommodated state can be made small, which achieves a further reduction in length of the zoom lens 1 in the optical axis direction as compared with a conventional lens barrel which is equipped with a displaceable optical element such as the second lens group LG2 that is displaceable to an off-axis displaced position.

More specifically, when the zoom lens 1 moves from the ready-to-photograph state shown in FIG. 2 to the accommodated state shown in FIG. 1, the shutter unit SB varies the position thereof in the second lens group moving frame 8 forwardly, relative to the second lens group moving frame 8, and the shutter unit SB is positioned in the vicinity of the approximate center of the second lens group moving frame 8 in the optical axis direction in the accommodated state of the zoom lens 1. Thereafter, the rear of the first lens group frame 4 enters the front of the second lens group moving frame 8 so that the first lens group LG1 moves to a position immediately in front of the shutter unit SB, while the rear end of the third lens group frame 7 enters the rear of the second lens group moving frame 8 so that the third lens group LG3 moves to a position immediately behind the shutter unit SB. Accordingly, the optical elements of the zoom lens 1 from the first lens group LG1 to the third lens group LG3 are retracted and accommodated with efficiency in regard to space utilization in the optical axis direction. For instance, unlike the present embodiment, if it is assumed that the shutter unit SB is stationary at the ready-to-photograph position shown in FIG. 2 in the second lens group moving frame 8, the third lens group LG3 cannot enter in the second lens group moving frame 8 so as to coincide with the second lens group LG2 at the off-axis displaced position in a direction orthogonal to the optical axis O, as shown in FIG. 1, because the shutter unit SB prevents the third lens group LG3 from entering the second lens group moving frame 8, so that the length of the zoom lens 1 in the accommodated state increases by that amount. In contrast, in the present embodiment of the zoom lens 1, highly efficient space utilization is attained because an opening space is created in the space at the back of the second lens group moving frame 8, which is occupied by the shutter unit SB in the ready-to-photograph state, by making the shutter unit SB move into the space in the vicinity of the center in the second lens group moving frame 8 (in the optical axis direction) in the accommodated state which is occupied by the second lens group LG2 in the ready-to-photograph state, and also because the rear space thus created is used as an accommodation space for the third lens group LG3.

Moreover, since the optical elements from the first lens group LG1 to the third lens group LG3 approach the CCD support plate 23, which is a rear fixed member, while the third lens group LG3 is retracted to a position close to the filter 28, the length of the entire optical system including the optical elements ranging from the first lens group LG1 to the CCD image sensor 24 in the accommodated state has been shortened to achieve the slim zoom lens 1.

In the present embodiment of the zoom lens 1, a retracting operation of the second lens group moving frame 8 when the zoom lens 1 is fully retracted causes the shutter unit SB to come into contact with the third lens group frame 7 and subsequently press the third lens group frame 7 rearward, which causes the third lens group frame 7 to abut against the CCD support plate 23 to thereby prevent the shutter unit SB from moving rearward, so that a relative movement occurs between the shutter unit SB and the second lens group moving frame 8 which continues to perform the retracting operation thereof. Accordingly, no extra drive source is required to move the shutter unit SB relative to the second lens group moving frame 8 in the optical axis direction when the zoom lens 1 is fully retracted to the accommodated state; the above described relative movement between the shutter unit SB and the second lens group moving frame 8 is achieved by the retracting operation of the second lens group moving frame 8 itself. Additionally, since the third lens group frame 7 is moved rearward in the optical axis direction by being pressed by the shutter unit SB with no restriction by the AF nut 31b, an extra drive source is also not required to move the third lens group frame 7 to the retracted position thereof. Accordingly, it is possible to prevent the zoom lens 1 from becoming complicated in structure while improving the efficiency of space utilization in the zoom lens 1 in the accommodated state thereof.

In conventional zoom lenses using three lens groups, it is conventionally the case that a shutter and an adjustable diaphragm are installed in front of the second lens group (middle lens group). In contrast, in the present embodiment of the zoom lens 1, the shutter unit SB is positioned behind the second lens group LG2 in the ready-to-photograph state of the zoom lens 1. With this structure, an optical design in which the first lens group LG1 and the second lens group LG2 are positioned closely to each other with no need to take into consideration interference with the shutter unit SB at the telephoto extremity can be achieved, which is advantageous in achieving miniaturization of the zoom lens 1 and for providing a high zoom ratio. In addition, the above described improvement in efficiency of utilization of accommodation space is achieved by moving the shutter unit SB, which is positioned behind the second lens group LG2, forwardly relative to the second lens group moving frame 8 therein when the zoom lens 1 is fully retracted to the accommodated state. However, the present invention can also be applied to a type of lens barrel in which an advancing/retracting optical element corresponding to the shutter unit SB is positioned in front of a displaceable optical element corresponding to the second lens group LG2, not behind this displaceable optical element, when the lens barrel is in the ready-to-photograph state. In this case, the moving direction of the advancing/retracting optical element (corresponding to the shutter S and the adjustable diaphragm A) relative to the displaceable optical element (corresponding to the second lens group LG2) when the lens barrel moves from the ready-to-photograph state to the accommodated state is reverse to that in the above described embodiment of the zoom lens 1.

Moreover, in the above described embodiment of the zoom lens 1, specifically in the relationship between the second lens group frame 6 that holds the second lens group LG2 and the shutter unit SB that holds the shutter S and the adjustable diaphragm A, a displaced position holding device (the rotation limit projection 6$i$, the rotation limit surface 6$j$ and the rotation limit surface 9$p$) for preventing the second lens group LG2 from returning to the photographing position during the time the second lens group LG2 is positioned in the second lens group accommodation recess 9$g$ is provided between the second lens group frame 6 and the shutter support ring 9 while achieving a reduction in length (thickness) of the zoom lens 1 at the accommodated state. With this displaced position holding device, the second lens group LG2 and the shutter unit SB can be prevented from interfering with each other in the second lens group moving frame 8, which makes it possible to achieve an optical element retracting structure of the zoom lens 1 which operates in a secure and stable manner.

In the above described embodiment of the zoom lens, in the retracting operation, when the rear of the shutter unit SB comes into contact with the front of the third lens group frame 7 following the retracting movement of the second lens group frame 8, firstly the third lens group frame 7 retracts with the second lens group moving frame 8 and the shutter unit SB, and subsequently, at the stage at which the third lens group frame 7 abuts against the CCD support plate 23, the second lens group moving frame 8 and the second lens group frame 6 further retract relative to the shutter unit SB which is prevented from retracting. Unlike this structure, with the spring force of the third lens group biasing spring 39, which biases the third lens group frame 7 forward, being set stronger, it is possible to make the second lens group moving frame 8 and the second lens group frame 6 first move relative to the shutter unit SB at the stage at which the rear of the shutter unit SB comes into contact with the front of the third lens group frame 7 following the retracting movement of the second lens group frame 8. Namely, when the shutter unit SB retracts and comes into contact with the third lens group frame 7, a force which makes the third lens group frame 7 retract is exerted on the third lens group frame 7 via the shutter unit SB; however, the third lens group frame 7 does not retract and remains at the current position thereof because the forward biasing force of the third lens group biasing spring 39 is great. This also prevents the shutter unit SB from retracting, and accordingly, the positions of the second lens group moving frame 8 and the second lens group frame 6 relative to the shutter unit SB in the optical axis direction vary if the second lens group moving frame 8 and the second lens group frame 6 continue to retract. This relative movement brings the cylindrical lens holder 6$a$ of the second lens group frame 6 into the second lens group accommodation recess 9$g$ of the shutter support ring 9. Thereafter, upon the relative movement in the optical axis direction reaching a predetermined amount, the radially inner flange 8$c$ of the second lens group moving frame 8 comes into contact with the front of the shutter support ring 9 and thereafter the third lens group frame 7 retracts with the second lens group moving frame 8 and the second lens group frame 6 against the biasing force of the third lens group biasing spring 39. In this alternative case, the relative movement in the optical axis direction between the shutter unit SB and the second lens group frame 6 is performed at a timing earlier than that in the previously described embodiment, and therefore, the length of the second-lens-group-displacing control projection 23$a$ and the shape of the inclined displacing surface 23$b$ are appropriately determined so that the movement of the second lens group frame 6 to the off-axis displaced position is completed at least before the commencement of the relative movement in the optical axis direction between the shutter unit SB and the second lens group frame 6.

Although the present invention has been discussed based on the above illustrated embodiment, the present invention is not limited solely to the particular embodiment. For instance, although the second lens group LG2 serves as the displaceable optical element that is moved in a plane orthogonal to the optical axis O in the second lens group moving frame 8 while each of the shutter S and the adjustable diaphragm A serves as the advancing/retracting optical element that moves in the optical axis direction in the above illustrated embodiment, it is possible for any other combination of the displaceable optical element and the advancing/retracting optical element to be adopted instead.

Additionally, although the second lens group frame 6 that holds the second lens group LG2 is a swingable (rotatable) member which can swing (rotate) about the pivot shaft 35 in the above illustrated embodiment, the device which moves the displaceable optical element in a plane orthogonal to an optical axis is not limited solely to this type of swing mechanism, and can be a linearly moving mechanism which linearly moves the displaceable optical element between the on-axis position (photographing position) and the off-axis displaced position.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens barrel comprising:
a support ring movable in an optical axis direction;
a displaceable optical element supported by said support ring to be movable between a photographing position in which said displaceable optical element is positioned on said optical axis and a radially-displaced position in which said displaceable optical element is eccentrically displaced from said optical axis; and
an advancing/retracting optical element supported by said support ring to be movable in said optical axis direction relative to said support ring,
wherein, when said lens barrel is in a ready-to-photograph state, said displaceable optical element is held at said photographing position, and said displaceable optical element and said advancing/retracting optical element are aligned in said optical axis direction, and wherein, when said lens barrel moves from said ready-to-photograph state to an accommodated state in which no pictures can be taken, said displaceable optical element is held at said radially-displaced position, and said displaceable optical element and said advancing/retracting optical element are relatively moved closely to each other so as to at least partially coincide with each other in a direction orthogonal to the optical axis;

a holding member which holds said advancing/retracting optical element and is supported by said support ring to be movable in said optical axis direction relative to said support ring;

a movement limit device which determines a rear movement limit of said holding member in said optical axis direction;

a biasing member which biases said holding member toward said rear movement limit thereof; and a rear limit member positioned behind said holding member in said optical axis direction, wherein, when said lens barrel is in said ready-to-photograph state, said holding member is held at said rear movement limit thereof and said advancing/retracting optical element is positioned behind said displaceable optical element, and wherein, when said lens barrel moves from said ready-to-photograph state to said accommodated state, said support ring is moved rearward in said optical axis direction and said holding member abuts against said rear limit member so that said holding member is prevented from moving rearward in said optical axis direction thereby, whereby a relative movement in said optical axis direction between said holding member and said support ring occurs against a biasing force of said biasing member.

2. The lens barrel according to claim 1, wherein said rear limit member comprises:

a rear holding member which holds a rear optical element which is positioned behind said advancing/retracting optical element, said rear holding member being movable in said optical axis direction independently of said support ring; and a stationary member positioned behind said rear holding member, wherein, when said lens barrel moves from said ready-to-photograph state to said accommodated state, said rear holding member rearwardly moves with said holding member of said advancing/retracting optical element and comes into contact with said stationary member to thereby be prevented from further rearward movement.

3. The lens barrel according to claim 2, wherein, when said lens barrel is in said accommodated state, said rear optical element and said displaceable optical element at least partially coincide with each other in a direction orthogonal to the optical axis.

4. The lens barrel according to claim 2, wherein said stationary member supports an image pickup device.

5. The lens barrel according to claim 1, further comprising a front optical element positioned in front of said displaceable optical element, said front optical element being movable in said optical axis direction independently of said support ring when said lens barrel is in said ready-to-photograph state, wherein, when said lens barrel moves from said ready-to-photograph state to said accommodated state, said front optical element approaches said advancing/retracting optical element so that said front optical element and said displaceable optical element at least partially coincide with each other in a direction orthogonal to the optical axis.

6. The lens barrel according to claim 1, wherein said holding member comprises an accommodation portion formed at a position therein which aligns with said displaced position of said displaceable optical element in said optical axis direction so as to be capable of accommodating said displaceable optical element, wherein a movement of said support ring relative to said advancing/retracting optical element when said lens barrel moves from said ready-to-photograph state to said accommodated state causes said displaceable optical element to enter into said accommodation portion of said holding member.

7. The lens barrel according to claim 1, wherein said displaceable optical element comprises a lens group, and wherein said advancing/retracting optical element comprises a light quantity adjusting member which changes an aperture size of a photographing aperture.

8. The lens barrel according to claim 1, wherein said lens barrel is a zoom lens, in which focal length is variable, and wherein said displaceable optical element and said advancing/retracting optical element move integrally in said optical axis direction with a predetermined fixed distance therebetween when a zooming operation is performed in said ready-to-photograph state of said lens barrel.

9. The lens barrel according to claim 1, wherein said support ring is guided to move linearly in said optical axis direction without rotating about said optical axis.

10. The lens barrel according to claim 1, wherein a photographing optical system of said lens barrel comprises three lens groups, said displaceable optical element constituting one of said three lens groups and being positioned between a frontmost lens group and a rearmost lens group of said three lens groups.

11. The lens barrel according to claim 1, wherein said biasing member comprises a coil spring.

12. The lens barrel according to claim 1, wherein said displaceable optical element is supported by said support ring via a swingable member pivoted on said support ring at a pivot having an axis parallel to said optical axis.

13. A lens barrel comprising:

a support ring;

a first holding member supported by said support ring, said first holding member holding a displaceable optical element so that said displaceable optical element is movable between a photographing position in which said displaceable optical element is positioned on an optical axis and a radially-displaced position in which said displaceable optical element is eccentrically displaced from said optical axis;

a second holding member supported by said support ring, said second holding member holding an advancing/retracting optical element so that said advancing/retracting optical element is movable in said optical axis direction relative to said support ring;

an inserting/displacing-operation control device which holds said first holding member so that said displaceable optical element is held in said photographing position when said lens barrel is in a ready-to-photograph state, and holds said first holding member so that said displaceable optical element is held in said displaced position when said lens barrel is in an accommodated state in which no pictures can be taken;

an advancing/retracting operation control device which controls positions of said first holding device and said second holding device in said support ring so that said displaceable optical element held at said photographing position and said advancing/retracting optical element are aligned in said optical axis direction when said lens barrel is in a ready-to-photograph state and so that said displaceable optical element held at said radially-displaced position and said advancing/retracting optical element at least partially coincide with each other in a direction orthogonal to the optical axis; and a displaced position holding device which is provided between said first holding member and said second holding member, said displaced position holding device preventing said first holding member from moving toward said photographing position from said radially-displaced position independently of said inserting/displacing-operation control device during an initial stage of movement of said lens barrel from said accommodated state to said ready-to-photograph state.

14. The lens barrel according to claim 13, wherein said second holding member comprises an accommodation portion formed at a position therein which aligns with said radially-displaced position of said displaceable optical element in said optical axis direction, said displaceable optical element entering said accommodation portion when said lens barrel moves from said ready-to-photograph state to said accommodated state, wherein said displaced position holding device prevents said first holding member from moving toward said photographing position from said radially-displaced position when said first holding member and said second holding member at least partially coincide with each other in a direction orthogonal to the optical axis so as to make said displaceable optical element at least partially accommodated in said accommodation portion of said second holding member.

15. The lens barrel according to claim 13, wherein said first holding member is pivoted about a pivot having an axis extending parallel to said optical axis so that said displaceable optical element moves between said photographing position and said displaced position by forward and reverse swing movements of said first holding member about said pivot, respectively, and wherein said displaced position holding device comprises a pair of rotation limit surfaces which are respectively formed on one and the other of said first holding member and said second holding member to face each other in a rotation direction of said first holding member about said pivot and to be substantially parallel to said axis of said pivot.

16. The lens barrel according to claim 13, further comprising two displacing-operation assist portions which are formed on said first holding member and said second holding member, respectively, and configured to impart a component force in a direction to move said first holding member toward said radially-displaced position of said displaceable optical element, said component force being created by a relative movement between said first holding member and said second holding member in said optical axis direction when said two displacing-operation assist portions come in contact with each other at some point during a transition from said ready-to-photograph state to said accommodated state of said lens barrel.

17. The lens barrel according to claim 13, wherein said support ring is moved rearward in said optical axis direction when said lens barrel moves from said ready-to-photograph state to said accommodated state, and wherein said inserting/displacing-operation control device comprises:

a biasing member which biases said first holding member toward said photographing position; and a displacement guide portion which is formed on a stationary member which is positioned behind said first holding member, said displacement guide portion being configured to create a component force in a direction to move said first holding member toward said radially-displaced position against a biasing force of said biasing member by engaging with said first holding member when said support ring is moved rearward in said optical axis direction.

18. The lens barrel according to claim 13, wherein said displaceable optical element comprises a lens group, and wherein said advancing/retracting optical element comprises a light quantity adjusting member which changes an aperture size of a photographing aperture.

19. The lens barrel according to claim 13, wherein said lens barrel is a zoom lens, in which focal length is variable, and wherein said displaceable optical element and said advancing/retracting optical element move integrally in said optical axis direction with a predetermined fixed distance therebetween when a zooming operation is performed in said ready-to-photograph state of said lens barrel.

* * * * *